(12) United States Patent
Miller et al.

(10) Patent No.: US 9,132,499 B2
(45) Date of Patent: Sep. 15, 2015

(54) SYSTEM FOR MOUNTING A TRACTOR UNIT ON A GUIDE TRACK

(71) Applicant: LINCOLN GLOBAL, INC., City of Industry, CA (US)

(72) Inventors: Victor B. Miller, Jamul, CA (US); Richard D. Traver, San Diego, CA (US); Jamil C. Snead, San Diego, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 324 days.

(21) Appl. No.: 13/676,170

(22) Filed: Nov. 14, 2012

(65) Prior Publication Data

US 2013/0126497 A1 May 23, 2013

Related U.S. Application Data

(60) Provisional application No. 61/561,811, filed on Nov. 18, 2011.

(51) Int. Cl.
*B23K 37/053* (2006.01)
*B23K 9/095* (2006.01)
(Continued)

(52) U.S. Cl.
CPC .......... *B23K 9/0956* (2013.01); *B23K 9/12* (2013.01); *B23K 9/122* (2013.01); *B23K 37/0211* (2013.01); *B23K 37/0217* (2013.01); *B23K 37/0276* (2013.01); *B23K 37/0282* (2013.01); *B23K 37/0294* (2013.01); *B23Q 9/0042* (2013.01); *F16H 1/02* (2013.01); *F16H 35/00* (2013.01); *B23K 2201/06* (2013.01);
(Continued)

(58) Field of Classification Search
USPC .............. 219/59.1, 60 R, 60 A, 61.13, 124.1, 219/125.11, 125.12, 130.01
See application file for complete search history.

(56) References Cited

U.S. PATENT DOCUMENTS 2,660,128 A   11/1953   Hayes
2,705,329 A    4/1955   Miller
(Continued)

FOREIGN PATENT DOCUMENTS

CH   699022 A2   12/2009
DE   4036168 A1   5/1992
(Continued)

OTHER PUBLICATIONS

International Search Report dated Mar. 6, 2013.
(Continued)

*Primary Examiner* — Brian Jennison
(74) *Attorney, Agent, or Firm* — Perkins Coie LLP

(57) ABSTRACT

A tractor unit mounting mechanism includes a clamping assembly that is configured to engage and disengage a tractor unit to a guide track. The guide track includes a first rail and a second rail. The mounting assembly also includes at least one pivot block set that has a first pivot block and a second pivot block. Each of the first pivot block and the second pivot block includes a first rolling device and a second rolling device. When the tractor unit is in a disengaged position, a first distance between an outer portion of the first rail and an outer portion of the second rail is greater than a second distance between the first rolling devices of the at least one pivot block set, and the first distance is less than a third distance between the second rolling devices of the at least one pivot block set.

14 Claims, 26 Drawing Sheets

(51) Int. Cl.
*F16H 35/00* (2006.01)
*B23K 37/02* (2006.01)
*F16H 1/02* (2006.01)
*B23K 9/12* (2006.01)
*B23Q 9/00* (2006.01)
*F16C 29/04* (2006.01)

(52) U.S. Cl.
CPC ........... *B23Q2210/006* (2013.01); *F16C 29/04* (2013.01); *Y10T 74/19614* (2015.01); *Y10T 74/19642* (2015.01); *Y10T 74/19679* (2015.01)

(56) References Cited

U.S. PATENT DOCUMENTS

| | | |
|---|---|---|
| 3,128,368 A | 4/1964 | Franz et al. |
| 3,485,306 A | 12/1969 | Gulley |
| 3,756,670 A | 9/1973 | Harris |
| 3,844,468 A * | 10/1974 | Nelson et al. .................. 228/13 |
| 4,008,384 A | 2/1977 | Cecil |
| 4,158,315 A | 6/1979 | Kensrue et al. |
| 4,727,642 A | 3/1988 | Christner et al. |
| 4,767,048 A | 8/1988 | Kimbrough et al. |
| 4,791,270 A | 12/1988 | Nelson et al. |
| 4,841,123 A | 6/1989 | Novak et al. |
| 4,986,002 A | 1/1991 | Oros et al. |
| 5,558,268 A | 9/1996 | Acheson |
| 2007/0007264 A1 | 1/2007 | Zamuner |

FOREIGN PATENT DOCUMENTS

| | | |
|---|---|---|
| DE | 9214406 U1 | 1/1993 |
| GB | 1184605 A | 3/1970 |
| GB | 1534773 A | 12/1978 |

OTHER PUBLICATIONS

International Application No. PCT/IB2012/002373, International Search Report & Written Opinion, 9 pages, Mar. 8, 2013.
International Application No. PCT/IB2012/002375, International Search Report & Written Opinion, 11 pages, Mar. 6, 2013.
International Application No. PCT/IB2012/002377, International Search Report & Written Opinion, 12 pages, Mar. 6, 2013.
International Application No. PCT/IB2012/002378, International Search Report & Written Opinion, 10 pages, Mar. 8, 2013.
International Application No. PCT/IB2012/002383, International Search Report & Written Opinion, 10 pages, Mar. 8, 2013.
International Application No. PCT/IB2012/002390, International Search Report & Written Opinion, 11 pages, Mar. 8, 2013.

* cited by examiner

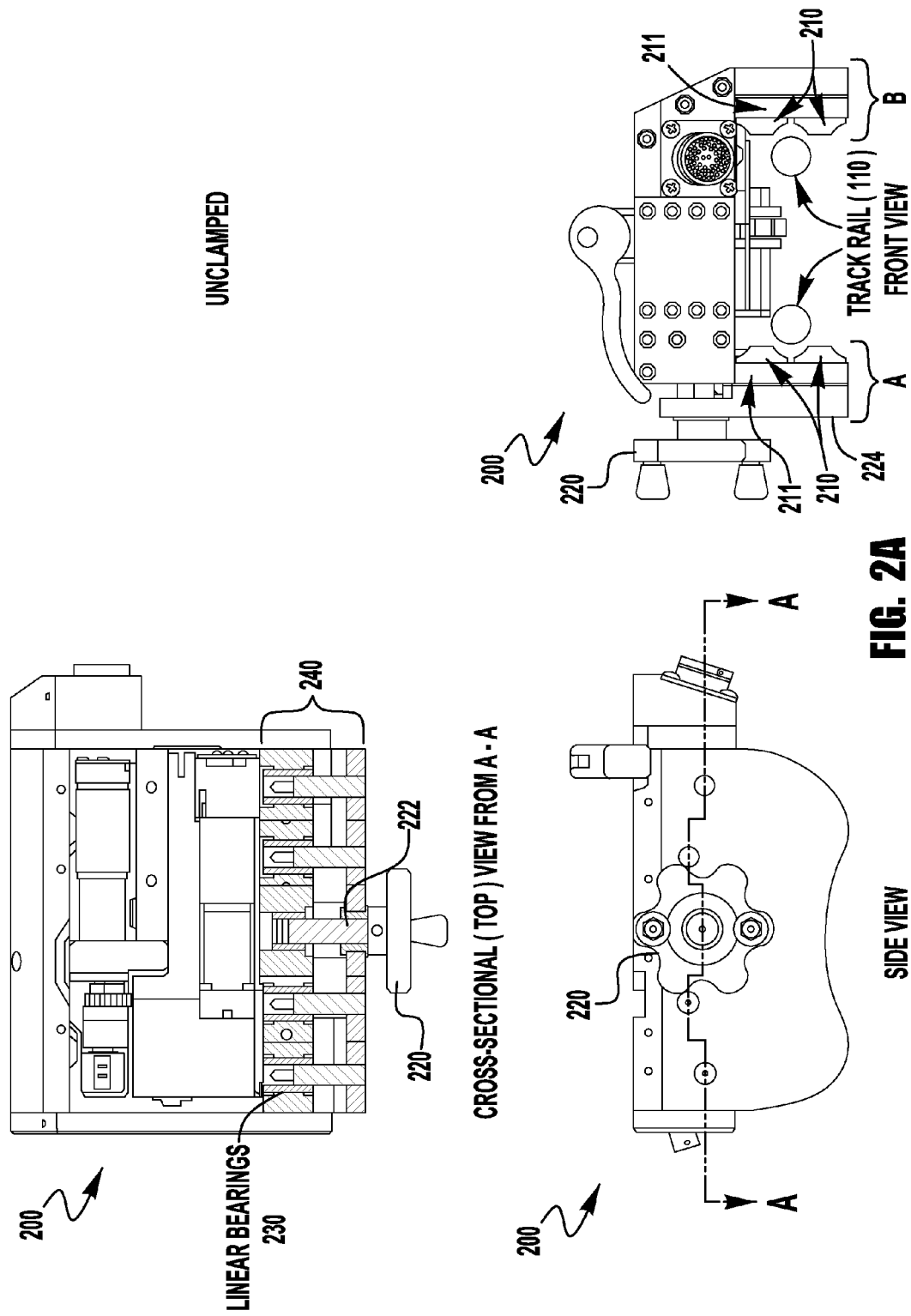

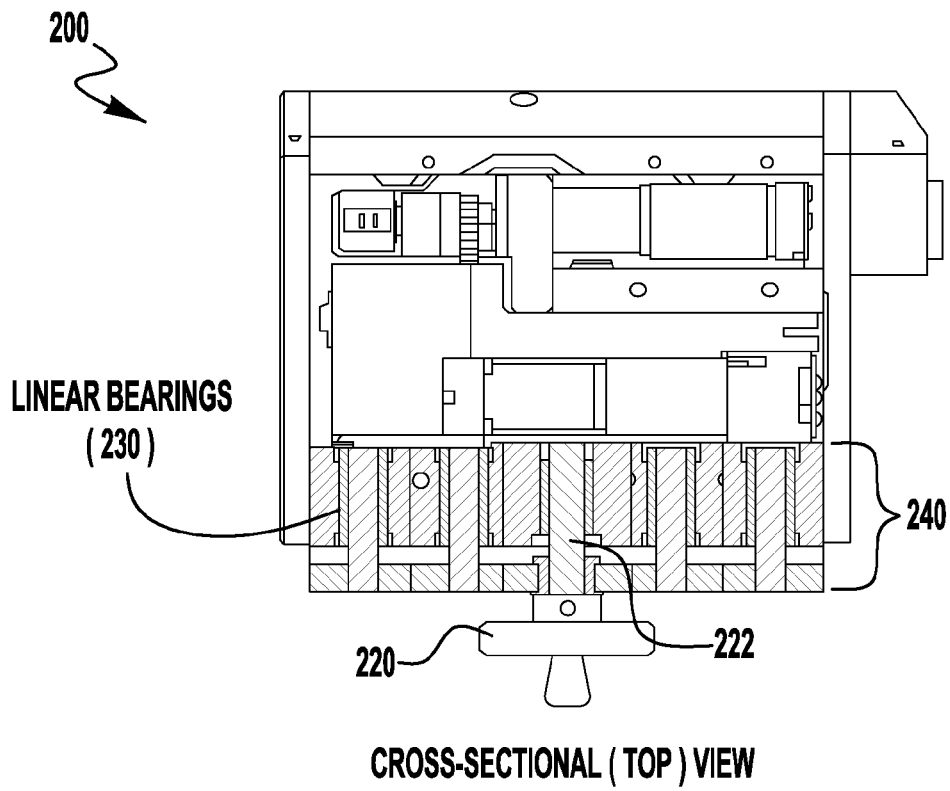
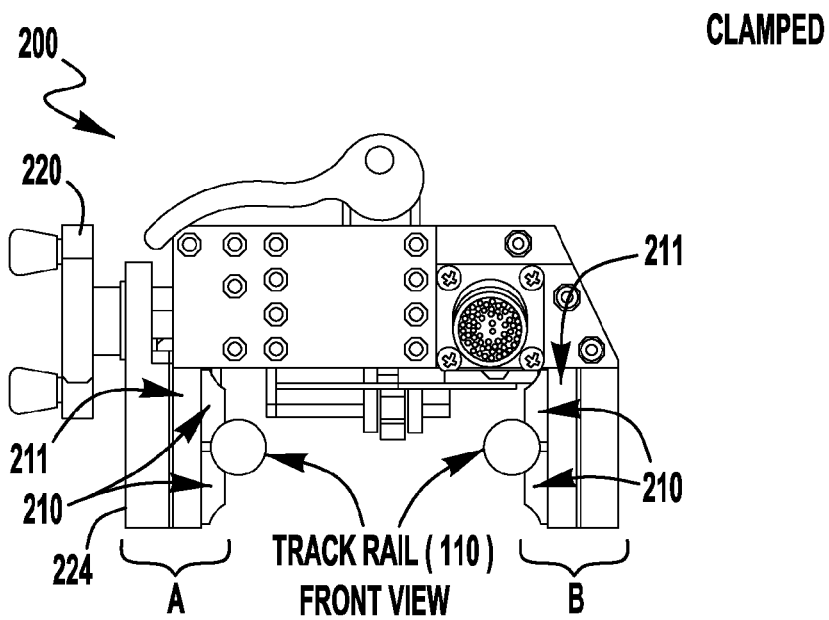
FIG. 2B

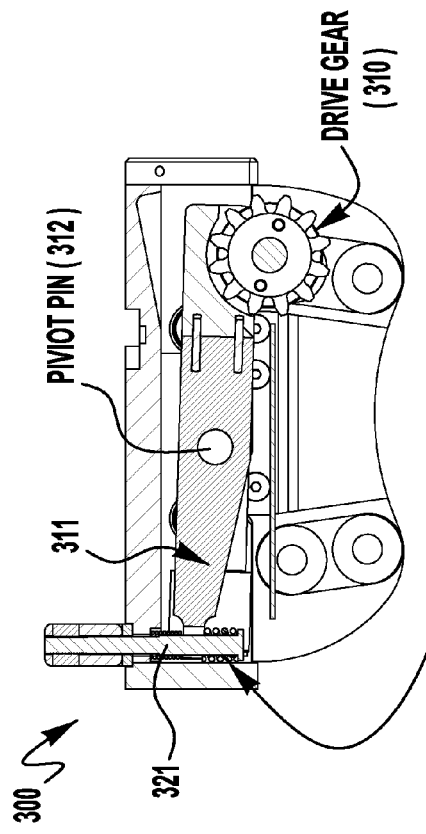
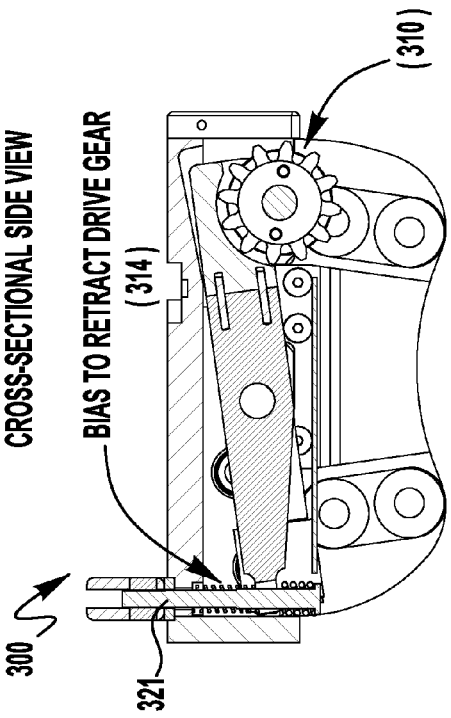
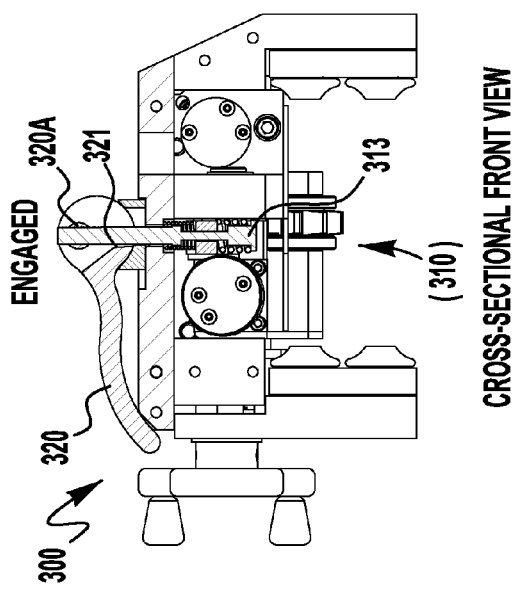
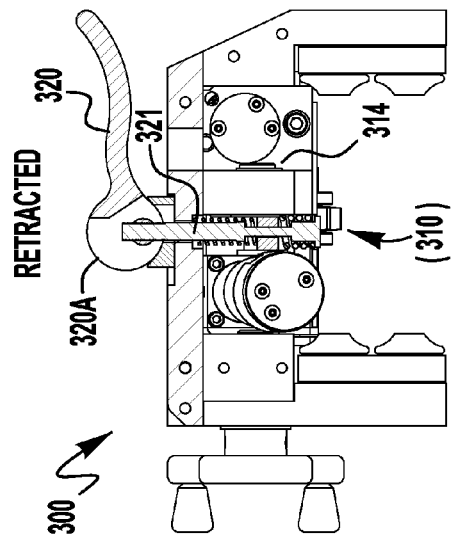
FIG. 3A
FIG. 3B

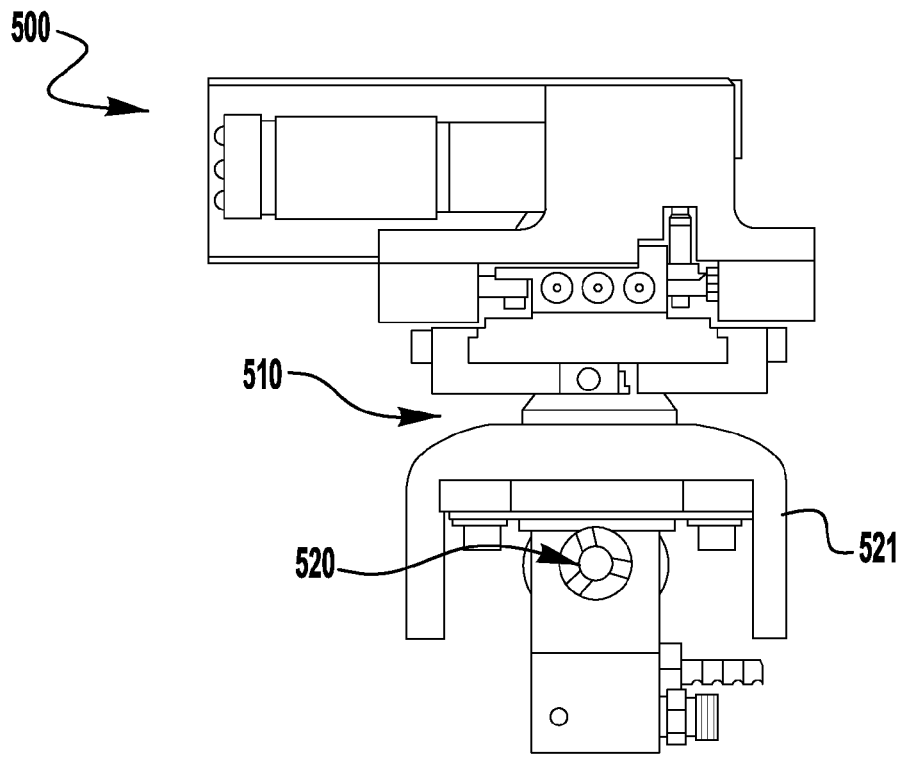
TOP VIEW ( TORCH AIMED DOWN )
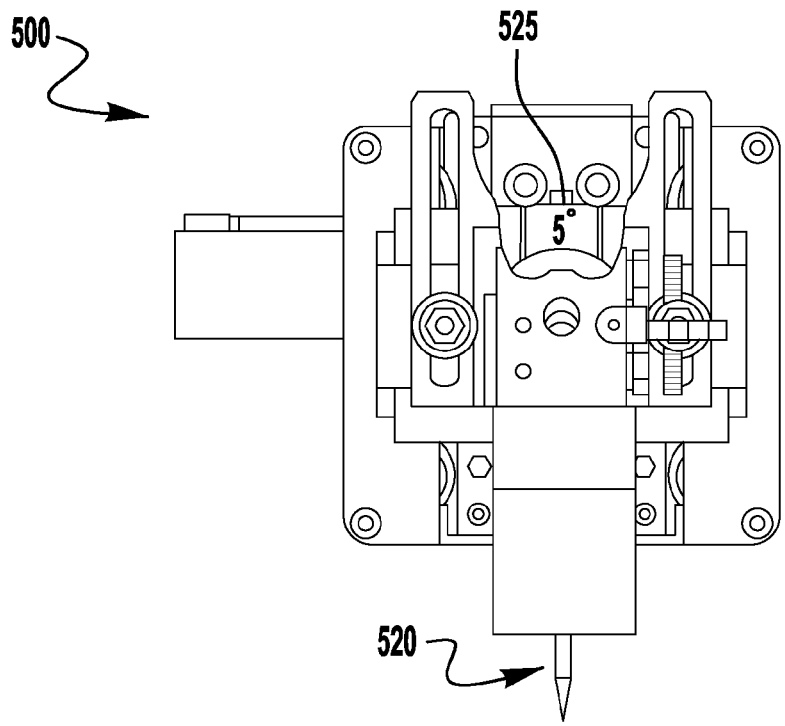
FRONT VIEW ( TORCH AIMED DOWN )
FIG. 5A

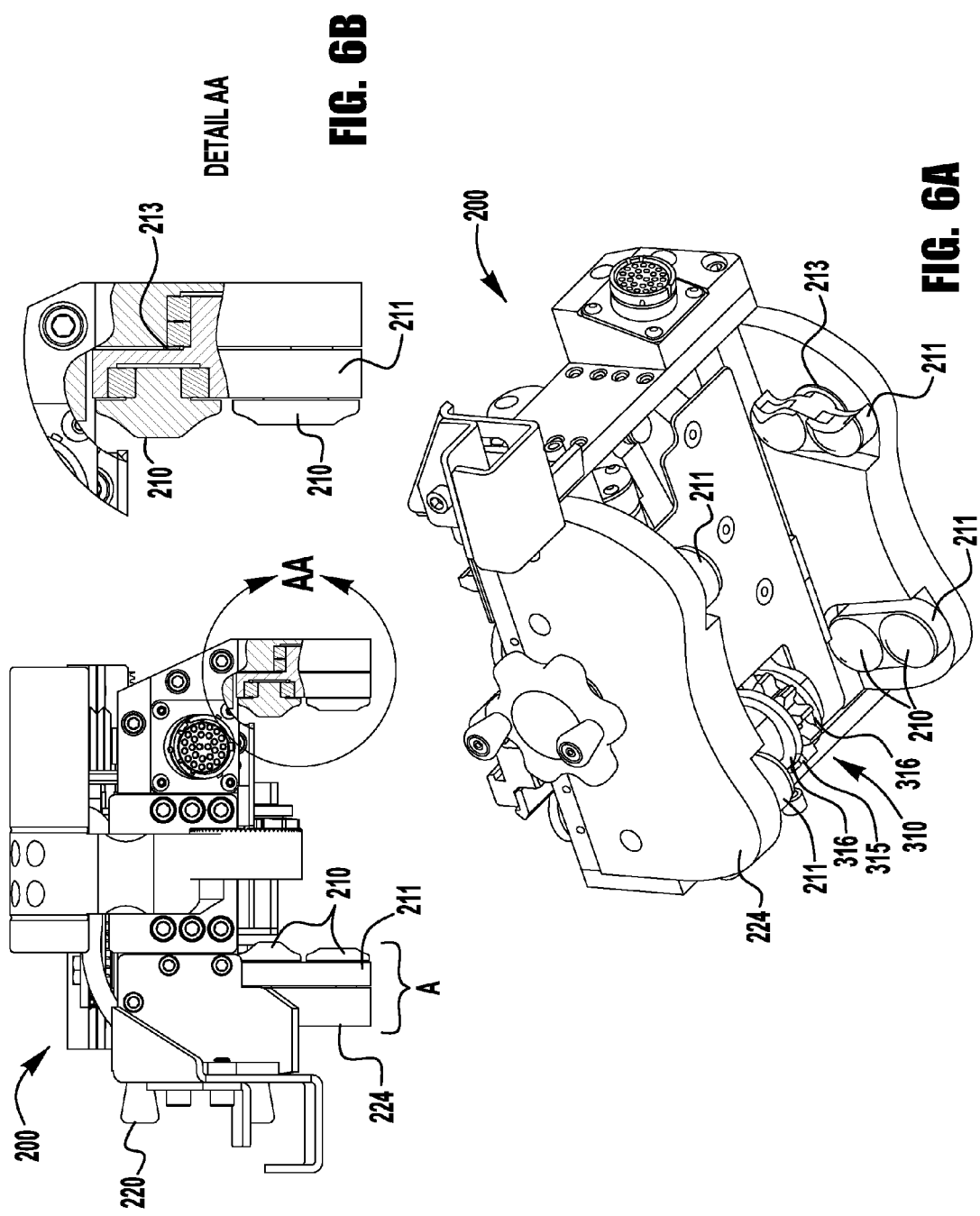

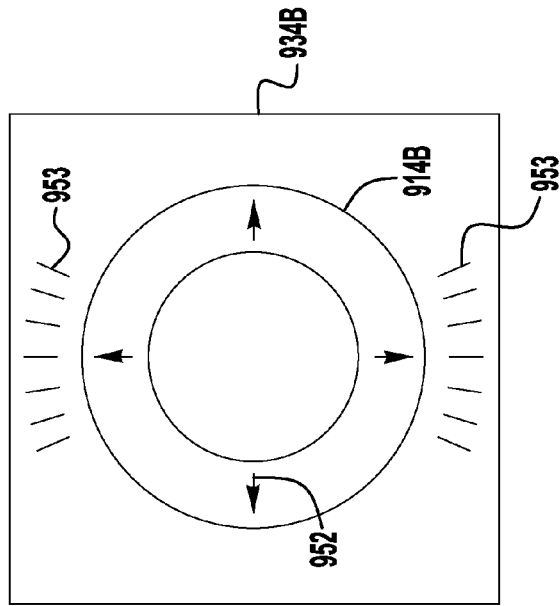
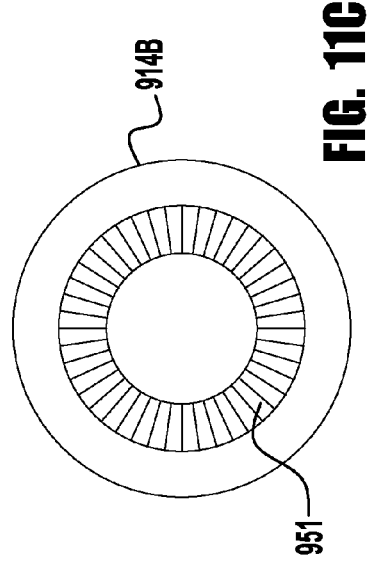
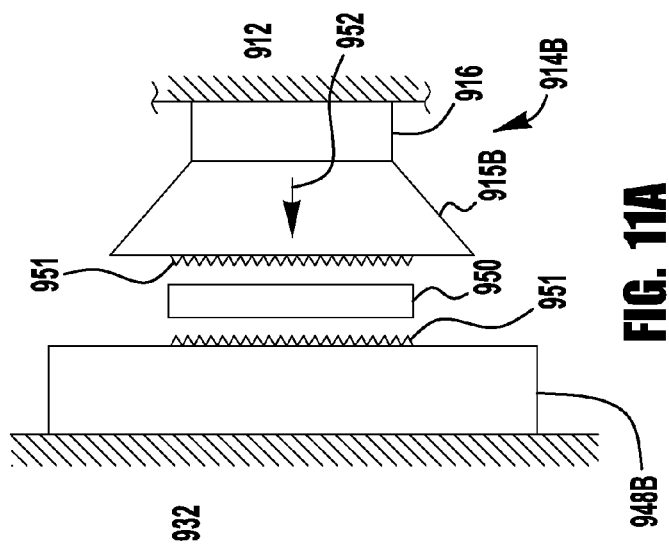

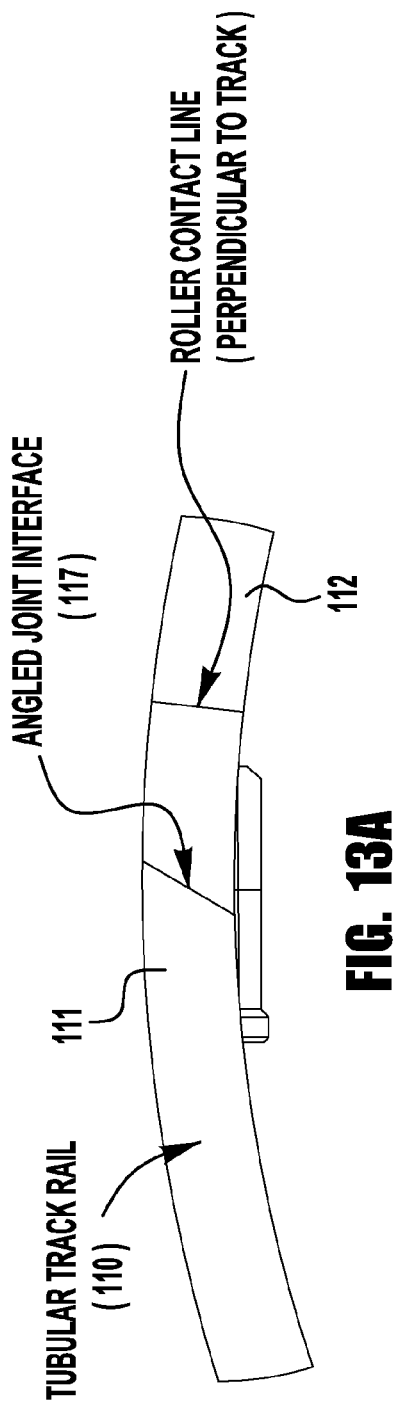
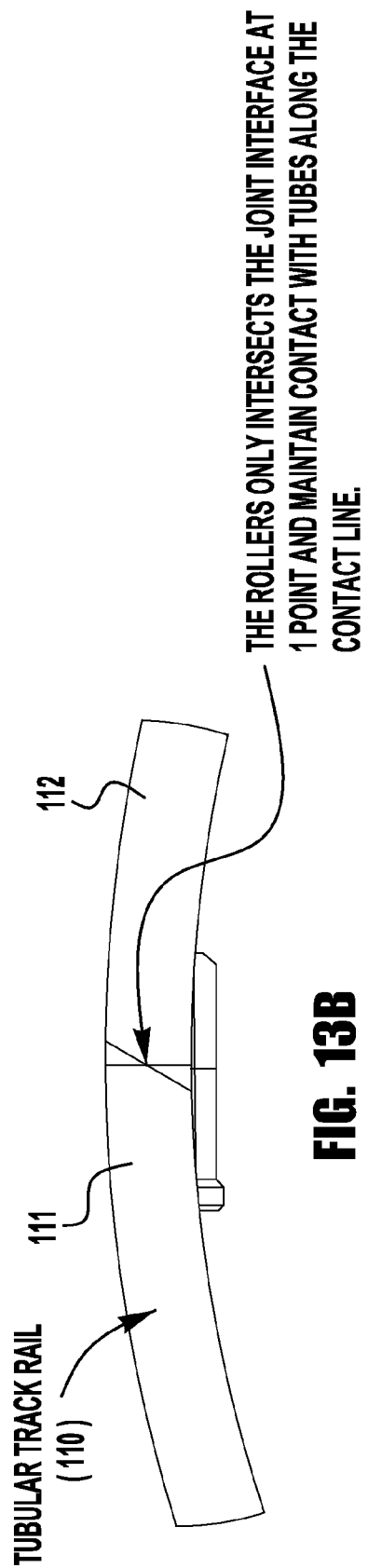

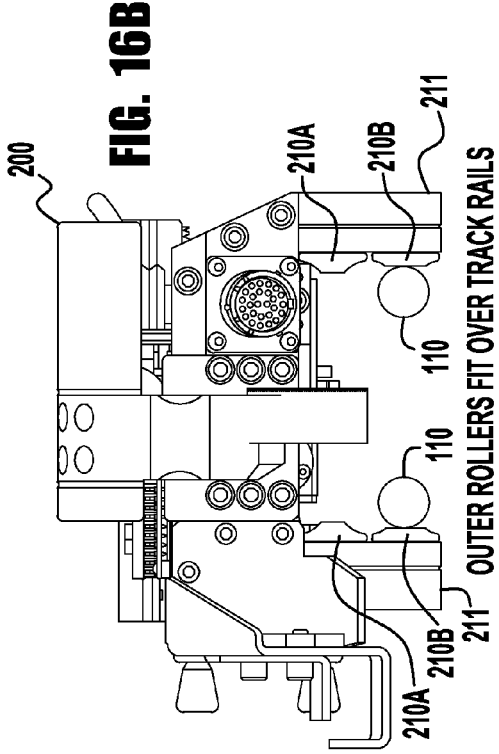
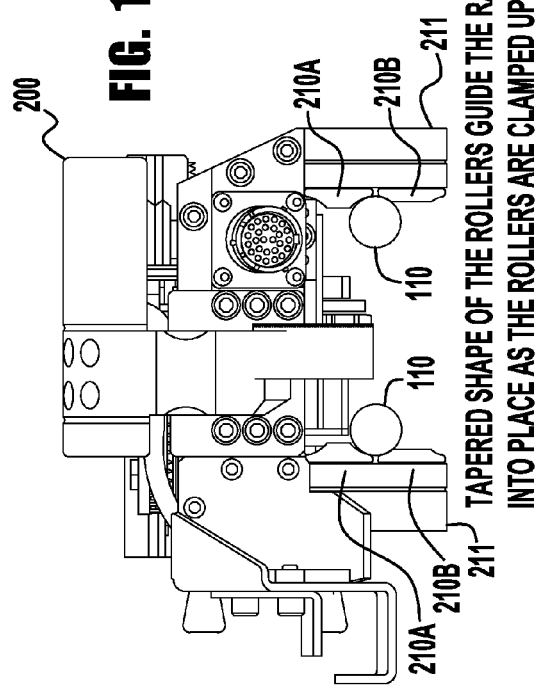
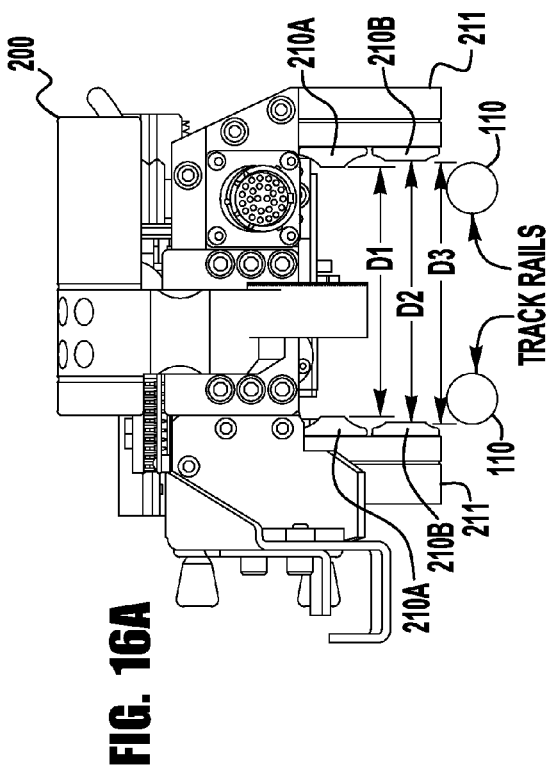
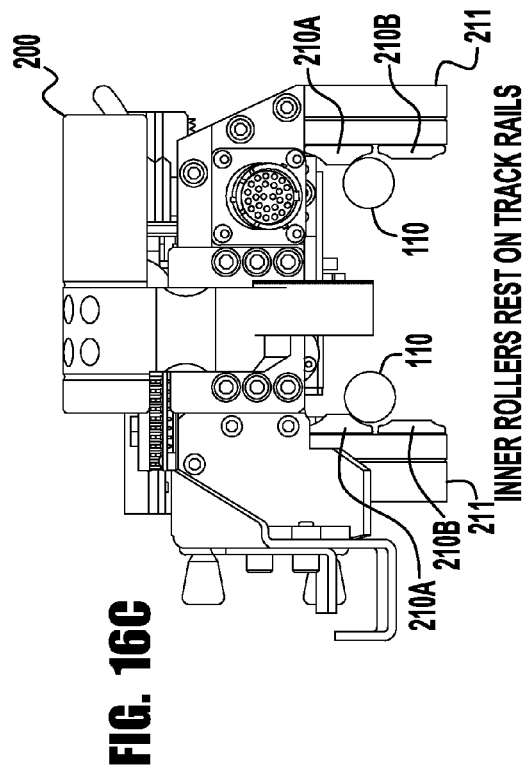

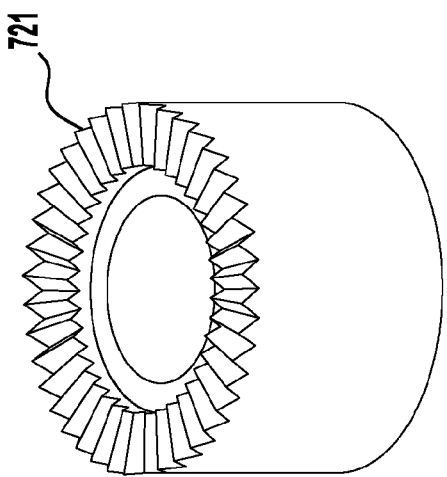
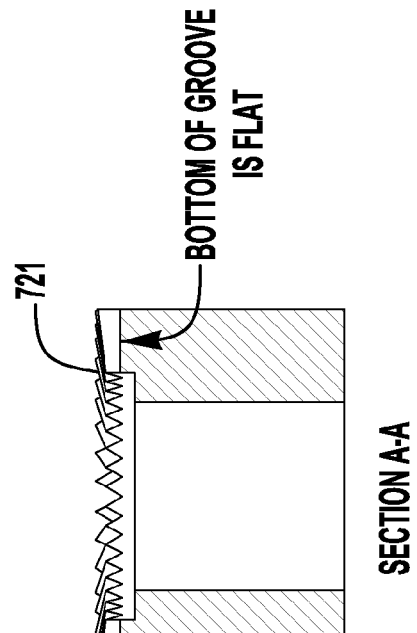
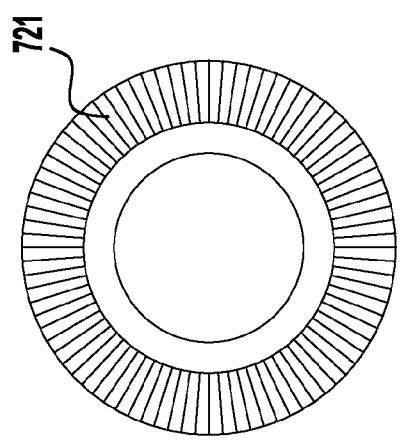
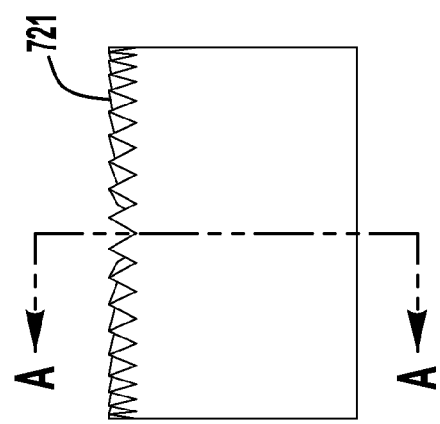
FIG. 17A

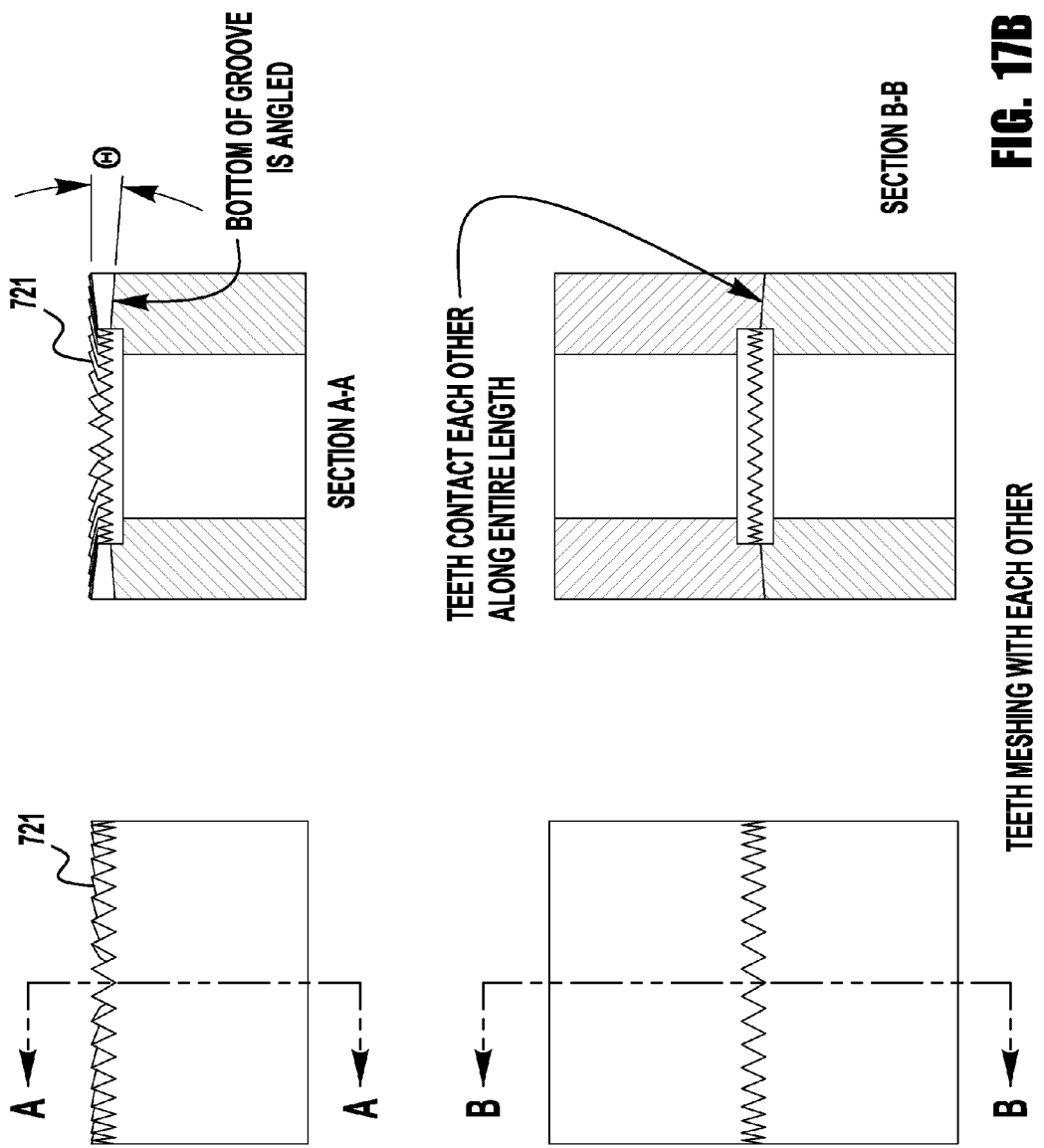

SYSTEM FOR MOUNTING A TRACTOR UNIT ON A GUIDE TRACK

PRIORITY

The present application claims priority to U.S. Provisional Patent Application No. 61/561,811, which is incorporated herein by reference in its entirety.

TECHNICAL FIELD

Certain embodiments relate to welding systems, devices, and processes. More particularly, certain embodiments relate to a system and/or method for mounting a tractor unit on a guide track, engaging a tractor drive to a track gear, adjusting an angle of a welding head, and/or adjusting a torch lead/lag angle in any of brazing, cladding, building up, filling, hardfacing overlaying, joining and welding applications.

BACKGROUND

This patent document relates to welding systems, devices, and processes.

Welding in large industrial applications, e.g., metal inert gas (MIG) and tungsten inert gas (TIG) pipe or plate welding, can involve welding together very thick work pieces in e.g., an orbital welding process. For example, the arc weld head in an orbital welding process can be rotated along a guide track around the work piece, e.g., continuously rotating the welding head 360° around the work piece such as a pipe, or rotating the head around the pipe for 180° on one side of the pipe and then repeating head rotation on the other side of the pipe. Many welding applications require precision welding, from the small standard workpieces to those of the larger scale. Welding systems can be designed to include a welding head and a guide track to which the welding head is movably engaged, e.g., the welding head can be mounted on tractor drive unit, to move along the guide track. For example, some orbital welding systems can have the guide track in a ring or orbital configuration that is engaged around a workpiece to guide the welding head to move along the weld gap. To fit the guide track around the workpiece, several track segments may be joined together to form the full guide track and to securely attach the guide track to the work piece, e.g., 360° around the work piece.

Accordingly, in conventional welding systems, the quality of a weld can be affected by the manner in which a tractor unit is mounted onto a guide track because the mounting can affect how smoothly the tractor unit will travel along the guide track. For example, an improperly mounted tractor unit on a track ring can flex as it moves around the track ring. The flexing can cause the tungsten electrode of the weld head that is attached to the tractor unit to move, e.g., the tungsten electrode can angle in when the tractor unit is at the "12 o'clock" position and angle out when it is at the "6 o'clock" position. This can occur when the tractor unit is not firmly mounted on the track, causing "crabbing" based on vibration or jerking. Additionally, mounting mechanisms can be fragile and easily damaged, e.g., binding and damage to tractor unit components can occur due to over-tightening.

In addition, improper alignment of the travel drive gear in the tractor unit to the track gear of the guide track can also cause problems with weld quality and delays in the welding process. For example, if the center of gravity of the weld head shifts due to, e.g., debris on the track gear, the gears on the travel drive gear and track gear can jam, especially if the system was not properly aligned. To reduce the problems associated with misalignment of the travel drive gear to the track gear, the travel speed of conventional tractor units may need to be set to slow.

Moreover, the mounting of the tractor unit onto guide track may be cumbersome due to the weight of the tractor unit. Typically, the rollers/wheels on a tractor unit need to be manually aligned before the rollers/wheels can engage and clamp onto the guide track. That is, as the tractor unit is being mounted on the guide track, an operator may need to physically jog the tractor unit back and forth while adjusting the engaging mechanism until the rollers/wheels of the tractor unit are properly aligned to the guide track. Because tractor units are relatively heavy, the mounting process may be physically exhausting, especially if the operator has to fight gravity while mounting the tractor unit.

Further, the orientation of electrode relative to the weld puddle and the arc length are important to producing proper welds, especially when mechanical oscillation is used. However, conventional systems and methods for orienting welding heads are not ideal in that they can produce poor quality welds. For example, FIG. 12 illustrates a prior art system for performing a fillet weld using a gas-shielded tungsten arc welding (GTAW) system (50). For brevity, only the components relevant to this discussion are illustrated. The GTAW system (50) includes a welding torch (10) that is oriented such that the torch (10) is, for example, perpendicular to the surface of weld puddle (40) as shown by line (12). The torch (10) is connected to a welding base (30) that provides mechanical oscillation as shown by arrow (32). As the torch (10) is moved across the weld puddle (40), the length of arc (5) will change, i.e., the distance between the tip of tungsten electrode (15) and the surface of weld puddle (40) will change. Accordingly, to maintain the proper arc length, an arc voltage control (AVC) assembly (20) moves torch (10) in the appropriate direction along arrow (22) as the mechanical oscillation moves the torch (10) in a direction (32). That is, the AVC assembly (20) adjusts the distance between the torch (10) and the weld puddle (40) in order to maintain the arc (5) at the desired length. However, because the AVC assembly stroke direction as illustrated by arrow (22) is different from the orientation of the torch (10) as illustrated by line (12), the resulting weld, can be of poor quality. In addition, poor quality welds can also occur due to limited AVC stroke (e.g., limited to approximately 1 inch AVC stroke) and/or limited rotation of the AVC assembly (e.g., limited to approximately 40 degrees) with respect to the welding torch and/or the workpiece (weld puddle). Further, poor quality welds can also occur if the attachment between the welding torch and AVC assembly and/or the attachment between the AVC assembly and the base unit are not stable due to being, e.g., insecure and/or weak and/or if the attachments have excessive wear due to, e.g., overuse and/or lack of durability.

Moreover, in conventional welding systems, the torch electrode lead/lag angle adjustment is limited, typically in the 0 to 5° range with some up to 12°. The limited lead/lag adjustment also limits the flexibility in setting up the welding configuration. In addition, the torch lead/lag adjustment mechanisms in conventional systems have numerous disadvantages such as: marring of weld head components, slippage of the weld head setup due to weak locking mechanisms, difficulty in accessing the lead/lag angle setup mechanisms, and inconsistent lead/lag angle settings—to name just a few.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Exemplary techniques, systems, and devices are described for welding systems that use a guide track, e.g., a guide track having a curved track rail profile. However, the exemplary embodiments discussed below are not limited to curved track systems and can be incorporated in any mobile welding system whether it is mounted on a curved track, straight track, or some other type of track or in a weld head that is stationary.

In one implementation, a welding system is provided to include a guide track that includes two tubular track rails that are aligned parallel to each other, one or more track cross members connecting the two tubular track rails to each other; a track gear that is located between the two tubular track rails and is connected to the one or more track cross members; a weld head tractor unit that is configured to be capable of being engaged to the guide track and being guided by the track gear to move along the guide track. The weld head tractor includes a weld head mount capable of holding a weld head for performing welding while the weld head tractor unit moves long the guide track.

The subject matter described in this specification can be implemented in specific ways that provide one or more of the following features. For example, disclosed technology can include the reduction of erratic, undesired movement, specifically at the transition joint from one track segment to the other, resulting in smooth motion of a weld head device upon an exemplary guide track of the disclosed technology. Other exemplary benefits can include reduced weight of the guide track of the disclosed technology, less waste produced in the welding process, improved durability, ease of engagement and disengagement of a weld head device with the guide track of the disclosed technology, and reduced costs of manufacturing the exemplary guide track.

In some exemplary embodiments, the present invention can comprise a travel drive gear engagement mechanism for a tractor unit that includes a clutch lever including a cam portion. The clutch lever is configured to rotate between a first position and a second position at a point that is offset from a center of an elongated portion of the cam portion. The engagement mechanism also includes a connecting member that operatively connects the cam portion of the clutch lever to a drive gear of a tractor unit. The connecting member is operatively connected to the cam portion at the offset point. The clutch level and connecting member are configured such that the drive gear engages a track gear when the clutch lever is in the first position and disengages from the track gear when the clutch lever is in the second position.

In some exemplary embodiments, the present invention can comprise a tractor unit mounting mechanism that includes a clamping assembly configured to engage and disengage the tractor unit to a track guide. The tractor unit includes at least two pivot blocks with each pivot block including at least one rolling device and a locking mechanism. The at least one rolling device is designed to roll on a rail of the guide track. The clamping assembly is configured to operatively connect the at least one rolling device with the guide track when the tractor unit is engaged. The pivot block is configured to pivot such that the at least one rolling device can conform to a profile, e.g., a concave profile, convex profile, a straight profile, or any combination thereof, of the guide track as the tractor unit is engaging the guide track. The locking mechanism, e.g., a bushing, is configured to prevent the pivot block from pivoting once the tractor unit has engaged to the guide track.

In some exemplary embodiments, the present invention can comprise a tractor unit system that includes a tractor unit including a travel drive gear. The travel drive gear includes a drive gear portion and at least one drive roller portion. The system also includes a guide track that has a track gear. The track gear includes a track gear portion and at least one land portion. The at least one drive roller portion and the at least one land portion are configured such that the at least one drive roller portion contacts the at least one land portion when the drive gear portion is engaged to the track gear portion. In some embodiments, a diameter of the at least one drive roller portion is equal to a pitch diameter of the drive gear portion. If the track gear portion is curved, in some embodiments a diameter of the at least one land portion equals a pitch diameter of the track gear portion. In other embodiments, if the track gear portion is straight, a dimension of the at least one land portion equals a pitch line of the track gear portion.

In some exemplary embodiments, the present invention can comprise a weld head angle adjustment system that includes a weld head, a base unit, and an angle adjustment mechanism. The weld head includes a welding torch and an arc voltage control assembly that is operatively connected to the welding torch and configured to move the welding torch. The angle adjustment mechanism is operatively connects the weld head to the base unit and is designed to change an angle between the welding torch and the base unit while ensuring that an orientation between the welding torch and the arc voltage control assembly remains fixed as the angle between the welding torch and the base unit is changed. In some embodiments, the angle adjustment mechanism includes a bolt that connects the weld head to the base unit. The angle adjustment mechanism is configured such that the angle between the welding torch and the base unit can be adjusted when the bolt is in a first state and the angle is fixed when the bolt is in a second state. In exemplary embodiments, the angle adjustment mechanism adjusts an angle between the weld head and the welding base unit to provide the desired orientation of the welding torch to the workpiece (or weld puddle), when the welding base is appropriately oriented to the workpiece. In some embodiments, the angle adjustment mechanism is a single point adjustment in that a single adjustment of the angle between the weld head and the welding base unit provides the proper orientation of the weld head to the workpiece (or weld puddle). In exemplary embodiments, the orientation of the welding torch with respect to the AVC assembly remains fixed as the angle adjustment mechanism is changed. In some embodiments, the AVC assembly stroke direction is aligned with the orientation of the welding torch and perpendicular to the workpiece (or the surface of the weld puddle).

In some exemplary embodiments, the present invention can comprise a lead/lag torch angle adjustment system for a weld held. The weld head device includes a torch head assembly that includes an electrode. The weld head device also includes a support device that supports the torch head assembly and a barrel assembly that is operatively connected to the torch head assembly and the support device. The barrel assembly is configured to change at least one of a lead angle and a lag angle of the electrode with respect to a workpiece. The barrel assembly includes an adjustment mechanism that includes a first section that is operatively connected to the torch head assembly. The adjustment mechanism also includes a second section that is configured to accept the mount plate. The barrel assembly also includes a mount plate that is operatively connected to the support device and at least one barrel clamp. The barrel clamp is configured to attach to the mount plate and also configured to accept the second section. In some embodiments, the second section is conical shaped, and a transverse movement of the at least one barrel clamp produces a force on the conical shaped second section that forces the second section towards the mount plate. In some embodiments, the barrel assembly can include a lead/lag torch angle adjustment mechanism that changes the lead angle and/or the lag angle of the electrode in a range between 0 to at least 5 degrees, between 0 to at least 15 degrees, between 0 to at least 90 degrees, or between 0 to 180 degrees (i.e., the torch head assembly can rotate a full 360 degrees). In some embodiments, the support device can be an arc voltage control (AVC) assembly. The AVC assembly is configured to adjust a distance between the electrode and the workpiece (or weld puddle), i.e., the arc length. The weld head device can be connected to welding base unit. In some embodiment, the welding base unit can be a drive unit that moves the weld head along a weld joint, e.g., an orbital tractor drive unit in a track-mounted welding system. In other embodiments, the welding base unit is a stationary base unit and the workpiece is moved during operations. In some embodiments, the welding base unit may be configured to provide mechanical oscillation to the weld head. In some embodiments the barrel assembly can have locking mechanisms such as, for example, serrated or toothed surfaces that press against serrated or toothed surfaces on the support device (e.g., the AVC assembly). In some embodiments, the torch head barrel assembly and/or support device (e.g., the AVC assembly) can have alignment lines (e.g., scribed lines) to aid in the adjustment of the lead/lag angle.

In some exemplary embodiments, the present invention can comprise a tractor unit mounting mechanism that includes a clamping assembly configured to engage and disengage a tractor unit to a guide track. The guide track includes a first rail and a second rail. The mounting assembly also includes at least one pivot block set that has a first pivot block and a second pivot block. Each of the first pivot block and the second pivot block includes a first rolling device and a second rolling device. The first rolling devices are disposed on an inner portion of the respective pivot blocks and the second rolling devices are disposed on an outer portion of the respective pivot blocks with respect to the tractor unit. The at least one pivot block set is disposed on the tractor unit such that the first pivot block and the second pivot block are on opposite sides of the guide track when the tractor unit is mounted on the guide track. When the tractor unit is in a disengaged position, a first distance between an outer portion of the first rail and an outer portion of the second rail is greater than a second distance between the first rolling devices of the at least one pivot block set, and the first distance is less than a third distance between the second rolling devices of the at least one pivot block set. In some embodiments, the tractor unit includes at least two pivot block sets. In some embodiments, a width of the first rolling device is greater than a width of the second rolling device for each of the first pivot block and the second pivot block.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIGS. 2A and 2B illustrate an exemplary mounting mechanism for a weld head tractor unit;

FIGS. 3A and 3B illustrate an exemplary pivoting travel gear engagement for a weld head tractor unit;

FIGS. 5A and 5B illustrate an exemplary pivoting lead/lag torch angle mechanism for a welding system;

FIGS. 6A and 6B illustrate an exemplary locking mechanism that can be incorporated in the mounting mechanism of FIGS. 2A and 2B;

FIGS. 11A to 11C illustrate exemplary embodiments of a lead/lag torch angle adjustment mechanism that can be incorporated in the systems of FIGS. 5A, 5B and 9;

FIGS. 13A and 13B illustrate an intersection of a roller contact line with a joint interface for the track rail of FIGS. 1A, 1B, and 1C;

FIGS. 16A to 16D illustrate a tractor unit using the exemplary pivot block/roller arrangement in FIG. 15; and FIGS. 17A to 17D illustrate exemplary serration or toothed surface configurations that can be incorporated into the angle adjustment mechanism of FIG. 8.

Like reference symbols and designations in the various drawings indicate like elements.

DETAILED DESCRIPTION

Figure 1A:
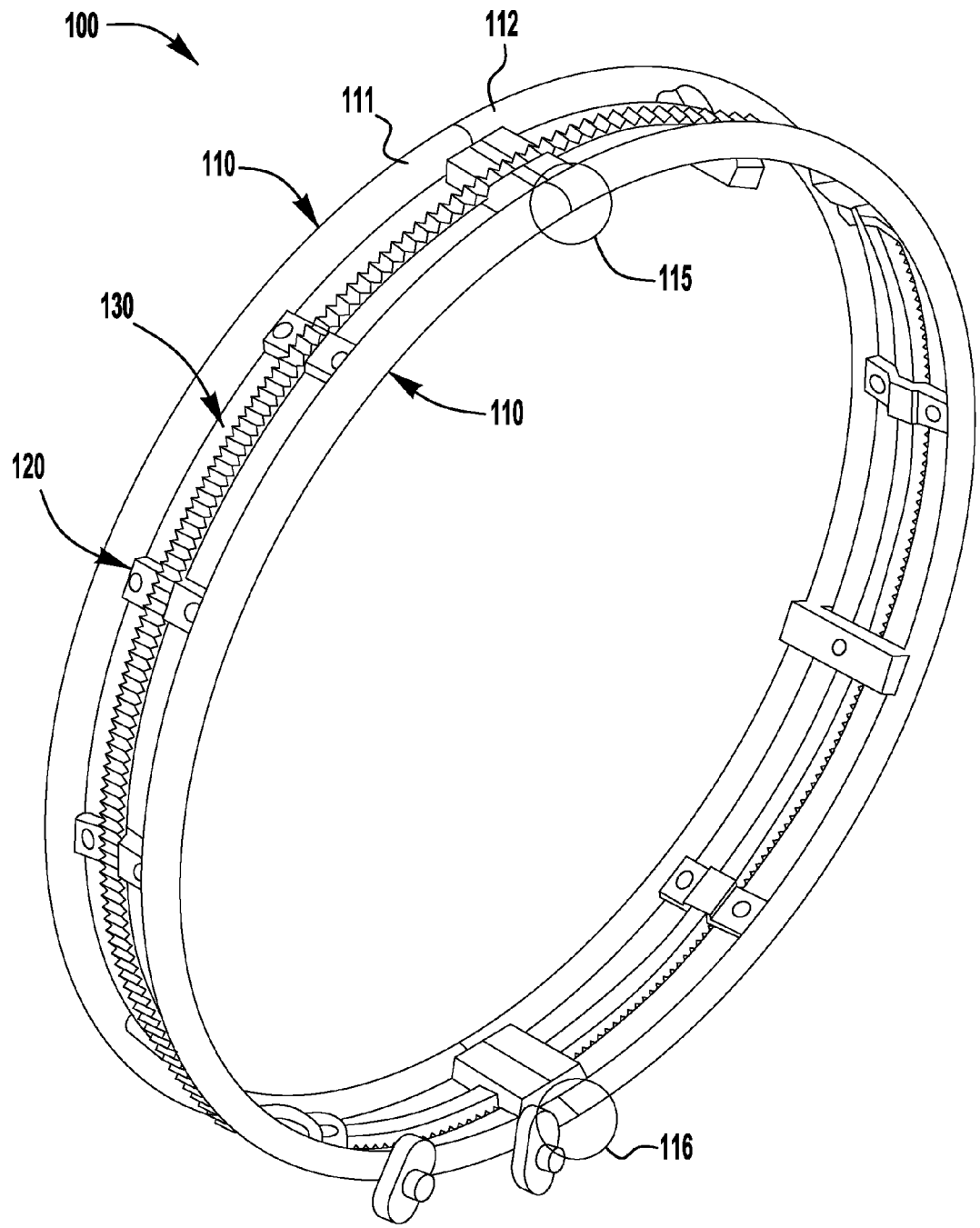
FIGS. 1A, 1B, and 1C illustrate an exemplary guide track featuring a tubular track rail.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Examples are provided to illustrate various techniques, systems, and devices for welding systems that use a guide track with two or more track segments connected to guide the welding head and a welding head tractor device that drives the welding head along the guide track in performing the welding.

A guide track with two or more track segments can be designed to allow for easy disengagement the guide track from a work piece such as a large pipe. One of technical challenges in joining two or more track segments to form a guide track is the presence of a discontinuity between two joined track segments. Such a discontinuity can affect the travel motion of the welding head by causing, e.g., a jump, interrupt, or stutter of the continuous motion of the welding head in the weld gap. This can adversely affect the precision of the welding operation and lead to imprecision in welding, such as degradation in the integrity and strength of the welded joint. Imprecision in welding can have severe repercussions for a variety of welding applications. An imprecise weld can be associated with the motion of a weld head tractor unit along a guide track (e.g., mounted around a work piece such as a pipe), which can be disrupted during transition from one track segment to another track segment at the perpendicular joint. For example, track discontinuities at the track segment transition region can cause the unit to jump or stutter until the transition point has been passed, which can lead to an improper or unacceptable weld. Welding tracks that provide single-point of contact rollers to the track rails can be susceptible to uneven regions along the guide track.

In one aspect, the disclosed technology can include a guide track configured to provide a smooth interface with a weld head tractor unit (e.g., a weld head tractor for orbital welding applications) along the guide track, including a smooth and curved edge to ensure smooth motion of the weld head and a smooth and continuous transition in the interface between two adjacent track segments. The curved edge of the track may be in various desired shapes and the following example employs a circular shaped edge.

FIG. 1A shows a three dimensional view of an exemplary guide track (100) that includes two track rails (110) that are configured as tubular rails with circular exterior surfaces. The two tubular track rails (110) are positioned on the outside of the guide track (100) that is shaped as a ring guide track which can be mounted to a cylindrical work piece such as a pipe. Each tubular track rail (110) is formed by two or more track segments (111) and (112). A track segment, e.g., track segment (111), connects each track rail by at least one track cross member (120) that are engaged between respective engagement locations on the two track rails 110. Between the two track rails 110, a track gear (130) is provided at, e.g., a middle position between the two track rails 110, for engaging the welding head tractor device that carries the welding head. In this example, two half-circle track segments (111) and (112) that are connected to each other at two joints (115) and (116).

Figure 1B:
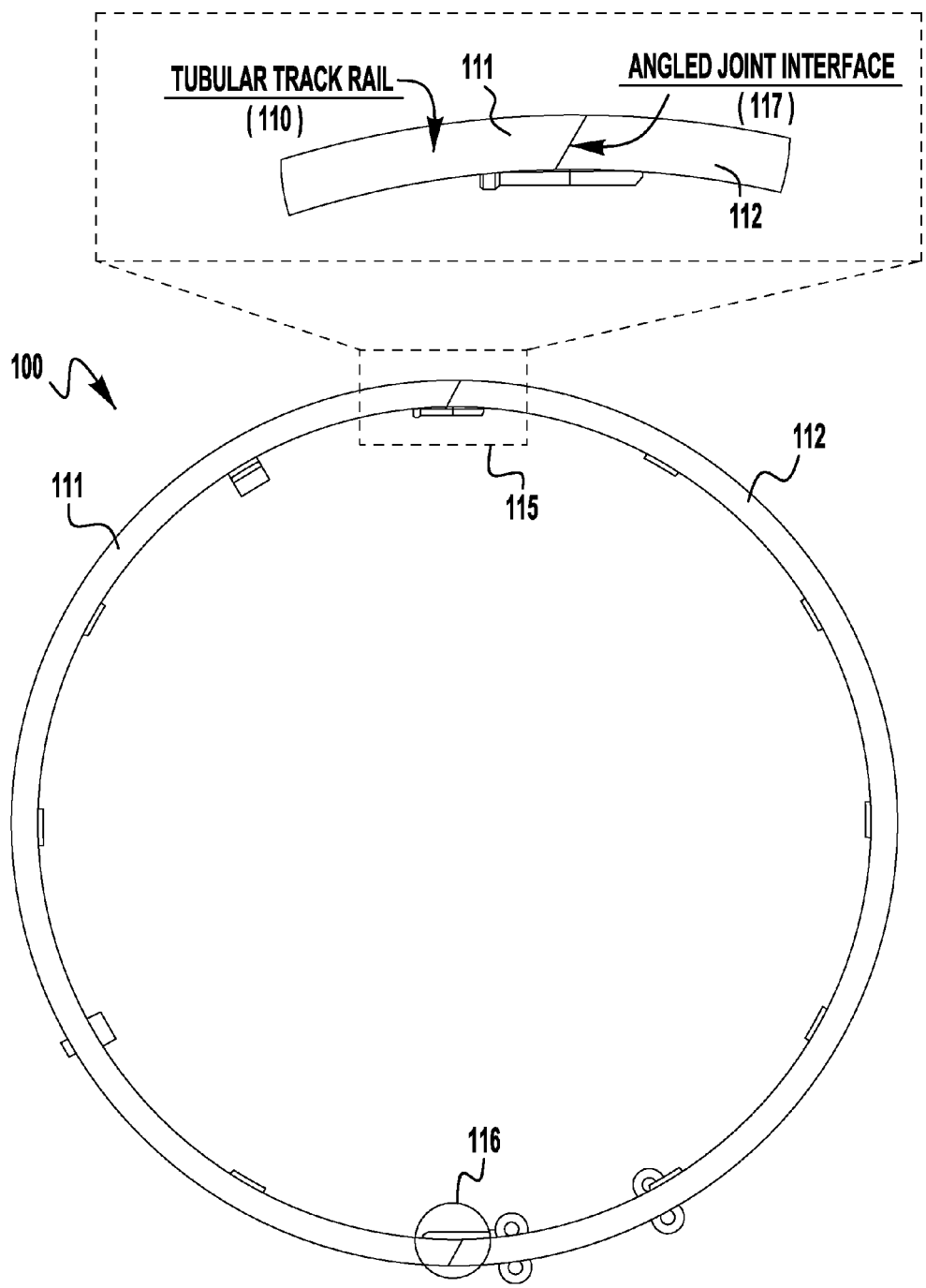

FIG. 1B shows a side view of the tubular guide track (100) in FIG. 1A. In this example, each tubular track rail (110) includes a transition between two track segments (111) and (112) at joint (115) that forms an interface at an acute angle with respect to the track. The insert in FIG. 1B shows that the end facet of each track segment (111) or (112) is an angle facet and two opposing facets of the track segments (111) and (112) match each other to form the angled joint interface (117). This design provides a smooth transition across the joined region. In operation of a welding system with such a track, a weld head tractor unit riding along tubular track rail (110) transitions across angled joint interface (117) of two track segments of guide track (100), the non-perpendicular alignment of angled joint interface (117) facilitates a non-abrupt, smooth transition from one track segment to the adjacent track segment to ensure a smooth and continuous weld to be filled in the weld gap. As illustrated in FIGS. 13A and 13B, the reason that a non-perpendicular transition is smoother is because the contact points (or contact line) of the rollers fall on a line that is perpendicular to the track (see FIG. 13A). If the joint interface is also perpendicular then all contact points of the rollers will hit the transition at the same time and cause a jump or stutter. However, in the present invention, the joint interface (117) is angled. Accordingly, the rollers only intersect the joint interface (117) at one point while still maintaining contact with track rail (110) at the other points along the contact line.

Various materials can be used to form the track trails in FIGS. 1A and 1B. An exemplary track rail of the disclosed technology can be of a metal, polymer, ceramic, or a composite material. The shape of the exemplary track rail can include a tubular geometry with a circular cross section, which can be hollowed, filled, or partially filled. Other shape of the exemplary track rail can include a rectangular or square shape with curved or rounded edges, in which one, two, three or four edges are rounded to any of a multitude of degrees of curvature, and the track rail can be hollowed, filled, or partially filled. The exemplary track rail can include other shapes in which the leading edge includes a curved contour. The curved contour shape of the exemplary track rail can increase the surface area between the track rail and the tractor unit (e.g., increasing the number of contact points, providing more support to the tractor unit by the track rail).

Figure 1C:
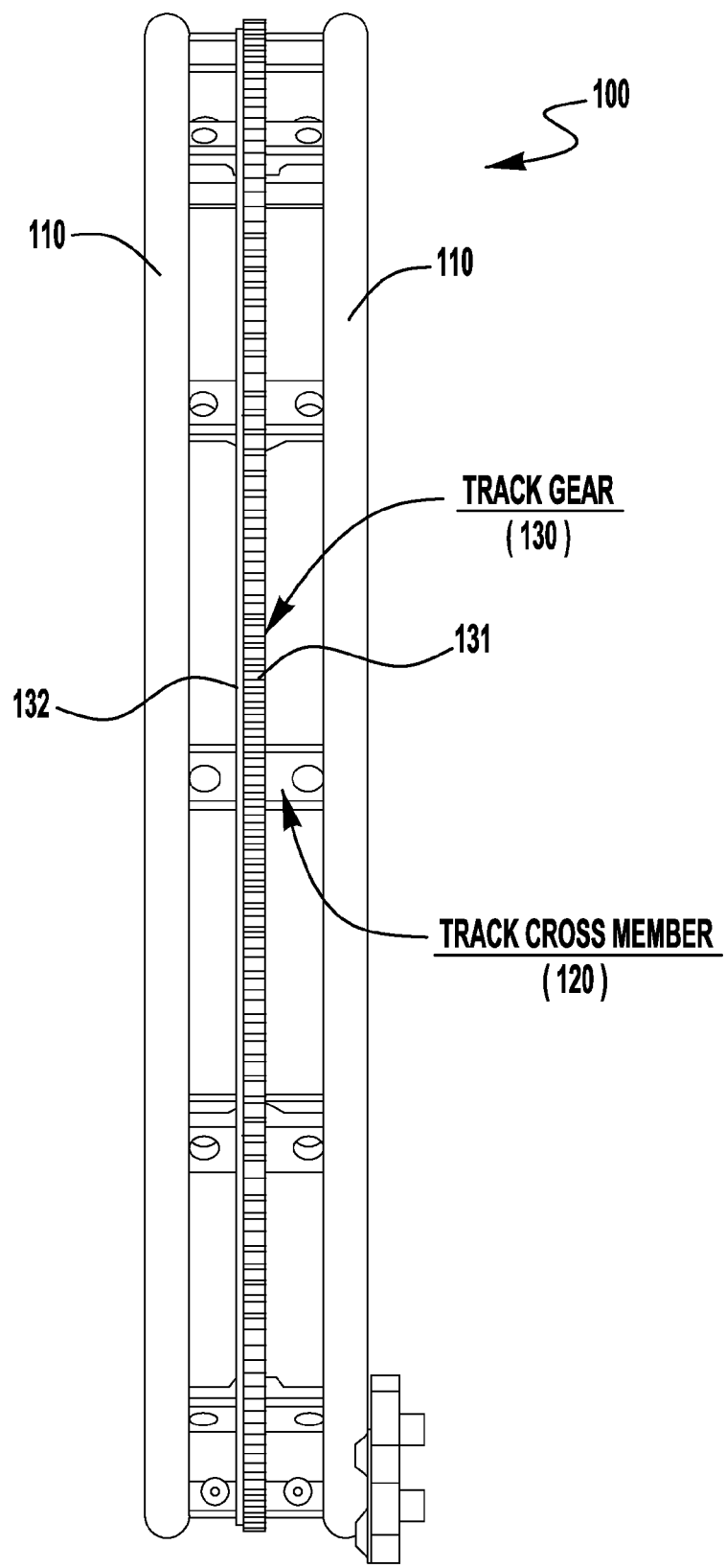

FIG. 1C shows another side view of guide track (100), which shows track segment (111) that includes track cross member (120) between multiple track rails, e.g., the two track rails exemplified by track rails (110). Track cross member (120) can connect the two track rails (110) such that they are aligned substantially parallel with each other. Track segment (111) shown in FIG. 1C includes multiple track cross members connecting the track rails (110). Track cross member (120) can also attach a track gear, such as the gear ring shown as track gear (130). Track segment (111) also includes multiple track cross members connecting the track gear (130).

Figure 1D:
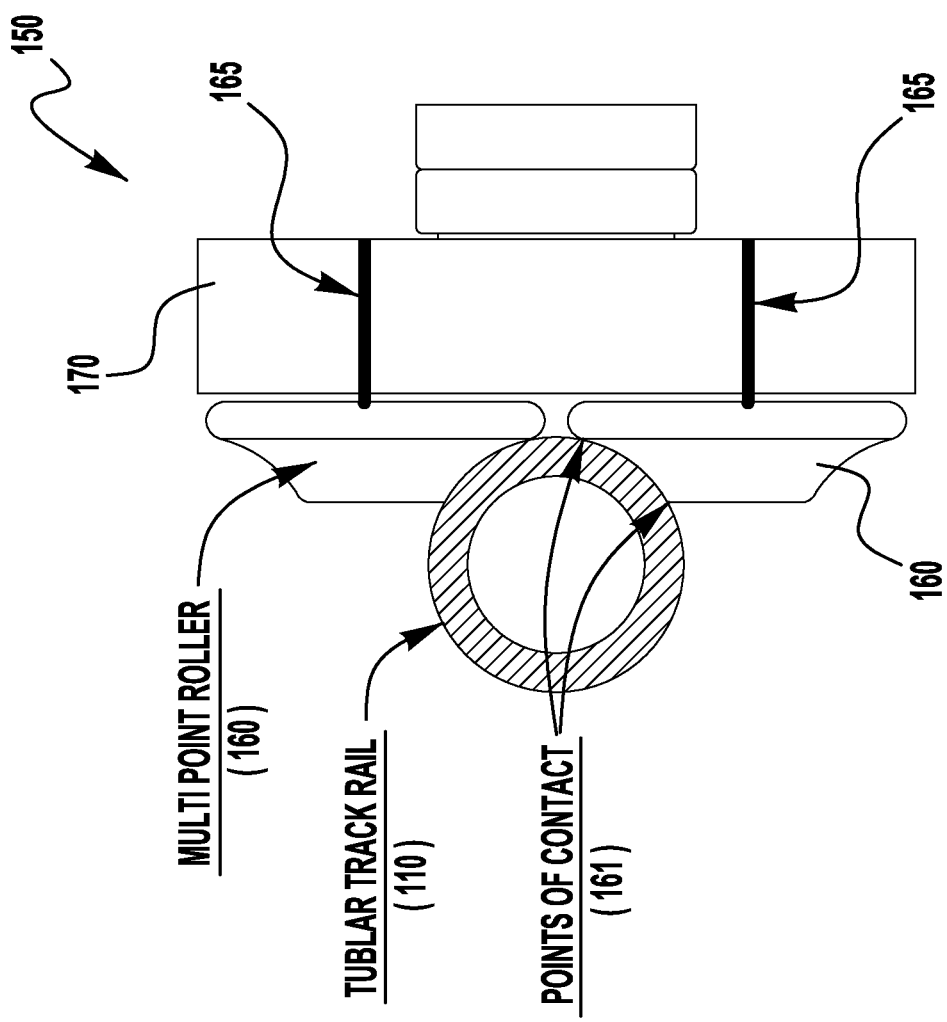
FIG. 1D illustrates an exemplary multi-point roller of a weld head tractor mount interfaced with an exemplary tubular track rail.

FIG. 1D shows the exemplary tubular track rail (110) that features a rounded shape or geometry, which can provide multiple points of contact to a mounting component of a weld head tractor unit, e.g., mounting component (150), for moving the weld head along the track rail (110). The exemplary mounting component (150) can include rollers or wheels (that interface with tubular track rail (110) at multiple points of contact (or contact line) (161). Two multi point rollers (160) are shown in FIG. 1D for contacting the track rail (110) and for rolling against the curved surfaces of the track rail (110) as part of mounting component (150). In this example, the multi point rollers (160) are connected to a pivot block (170) and can rotate around their respective roller rotation axis (165) when rolling along a track rail (110). The exemplary tubular track rail (110) of guide track (100) can provide multiple points of connection with the weld head tractor unit such that when the unit transitions across joints of the guide track, a consistent travel is facilitated. The tubular geometry of the track rail can enable an interface that allows for mounting component (150) to be in contact at multiple points, which can prevent the tractor unit from traveling in an undesired position, e.g., jumping, stuttering, or swerving to the left or the right due to discontinuity. For example, multi point roller (160) can travel along the track having multiple points of contact (161) so that at transition from one segment to the other (e.g., at angled joint interface (117)), there can be fewer disturbances than if the track segments were joined perpendicularly to each other.

The disclosed technology includes a tubular track that can use multipoint contact wheels and an angled and/or gradual transition joint that provides a smooth transition of a mounted device (e.g., a weld head tractor unit), which can significantly reduce undesired motions of the mounted device, e.g., swerves, jumps and stutters. This can provide a higher precision weld by significantly reducing abrupt, discontinuous motion of the weld head in the weld joint. Additionally, the exemplary guide track can have a reduced overall weight by using tubular members that are joined by cross members, rather than using a solid rectangular shaped track. The exemplary guide track can be manufactured with a reduced amount of material (e.g., that can be hollow or partially filled). For example, an exemplary guide track can have a reduced weight based on the geometry and/or material of the track rails, by reducing the amount of volume and/or density of the overall guide track. An advantage of reduced weight can include making it easier in moving the exemplary guide track to the next welding position. Additionally, reduced weight can also improve manufacturability, for example, by making the guide track out of multiple, smaller, less complicated parts, rather than one complex part. For example, manufacturability of an exemplary guide track can be made easier by forming steel tubing because the steel tube can be finished in one machining operation, for example, rather than three machining operations that a typical one-piece track would require. Cross member sections can be designed to work for any diameter size, e.g., with only two feature dimension alterations. The exemplary guide track can offer long lasting durability due to its tubular configuration. The tubular configuration provides a smooth circular contact surface that allows significantly reduced frictions. For example, the exemplary guide track can be of a steel material, such that in rugged environments the exemplary guide track can withstand dings and nicks, such that such dings and nicks to the track (e.g., tubular track rails) would not affect the motion of a mounted weld head tractor unit. The exemplary track guide can include a track gear with gear profiles that can provide smoother tractor motion. Also, the exemplary guide track of the disclosed technology can reduce welding system "set-up" factors, such as time and quantity and complexity of components.

Exemplary embodiments of the present invention can include a tractor mounting mechanism for a weld head tractor unit that enables the tractor unit to be mounted onto track rails that can have different shapes and/or sizes.

FIG. 2A illustrates a weld head tractor unit (200) with a tractor mounting mechanism that includes a track rail clamping assembly (240), which is shown in the unclamped position in FIG. 2A. As seen in the front view of the figure, in the unclamped position, the tractor unit (200) can be movably mounted to a guide track (e.g., guide track (100)) using a rolling device or rolling devices such as, e.g., wheels and/or rollers. The rail clamping assembly (240) includes a clamping mechanism (220) that is operatively connected to wheel/roller set A. To mount or dismount the tractor unit (200), the clamping mechanism (220) can be turned such that the rail clamping assembly (240) retracts wheel/roller set A (see front view of FIG. 2A). As part of the exemplary mounting mechanism, in some embodiments, the tractor unit (200) can be clamped or unclamped with the use of a single clamping action, i.e., by turning the clamping mechanism (220) to operate wheel/roller set A.

Figure 14A:
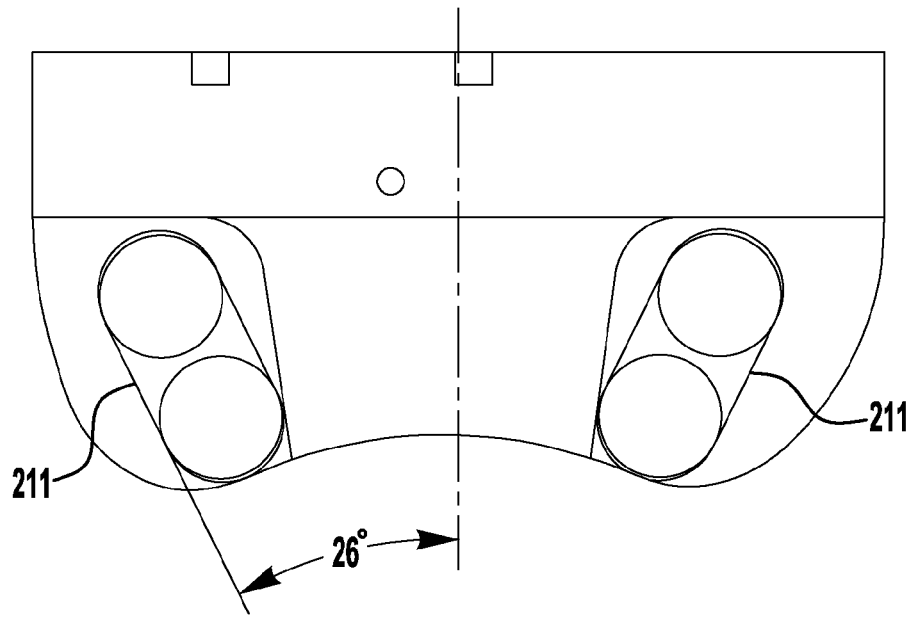
FIGS. 14A and 14B illustrate exemplary pivot angles for the pivot blocks of the exemplary mounting mechanism illustrated in FIGS. 2A, 2B, 6A, and 6B.
Figure 14B:
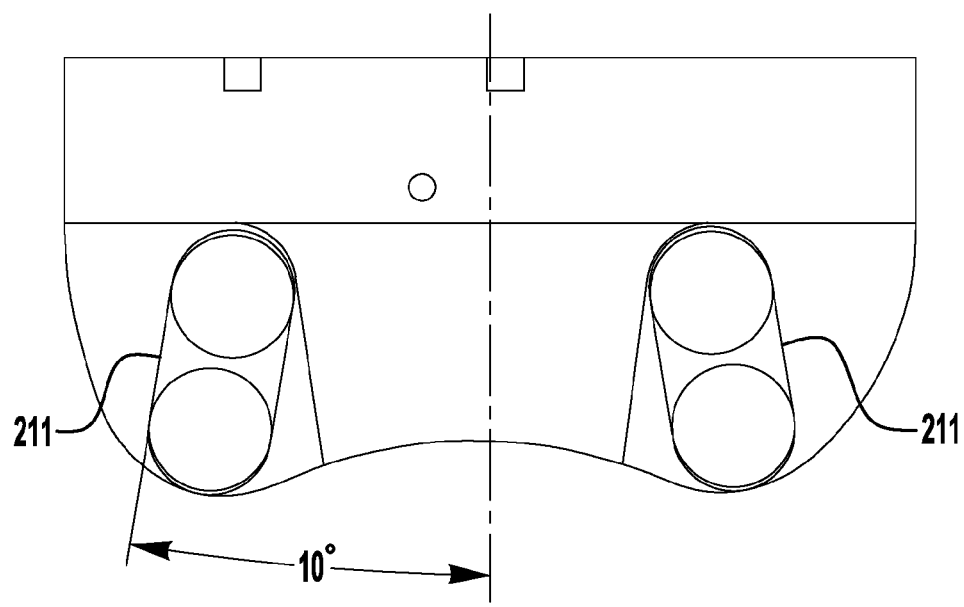

The exemplary mounting mechanism can also include multiple opposing wheels and/or rollers (210), e.g., wheel/roller sets A and B, which can conform to the track rails, e.g., track rail (110), which can be tubular or solid. The total number of wheels and/or rollers (210) on tractor unit (200) can be, e.g., eight. However, the tractor unit can have more or less wheels and/or rollers (210). In some embodiments, the wheels and/or rollers (210) can be mounted on pivot blocks (211). Each pivot block (211) can have at least one wheel or roller (210). For example, in some embodiments, each pivot block (211) has two wheels or rollers (210). Thus, the exemplary eight wheels/rollers (210) can include four sets of pivoting blocks (211) with two wheels/rollers mounted at each block. Of course, the number of pivot blocks (211) and the corresponding number of wheels/rollers (210) will depend on a number of factors such as the size and weight of the tractor unit (200), the size of the diameter of the track rails (110), the size of the wheels/rollers (210), etc. However, for typical track-mounted welding applications. e.g., orbital welding applications, it is contemplated that four pivot blocks (211) will be used, each block (211) having two wheels/rollers (210) and disposed, e.g., on a corner of tractor unit (200) (see, e.g., FIG. 6B). The pivot blocks (211) each include a central bearing that allows the respective pivot block (211) to pivot when the tractor unit (200) is unclamped. The angle of pivot is not limiting. However, to facilitate the mounting of the tractor unit (200) onto the track rails (110), the pivot blocks (211) can be limited to an inward pivot angle of up to 26° (see FIG. 14A) and an outward pivot angle of up to 10° (see FIG. 14B) with respect to a centerline between two pivot blocks (211). This pivoting movement can allow the rollers (210) to immediately conform to any profile of track rail (110), e.g., concave, convex, straight, or any combination thereof. The size and shape of the track rail (110) are not limiting and the size of the track rail (110) can range from, e.g., 1/16 inch to 2 inches and the shape can be, e.g., round, square, triangle, octagonal, or some other shape. Of course, the shape of the wheels and/or rollers (210) may change based on the size and shape of the track rail (110). In addition, the track rail (110) can be either tubular or solid. Further, the guide track (100) configuration is not limited to being a ring and can be, e.g., any of the track configurations illustrated in FIG. 3C, i.e., the convex guide track (391), the concave guide track (392), the straight guide track (393), and the variable guide track (394), or some other type of track configuration.

When the tractor unit (200) is clamped, the exemplary mounting mechanism can include a locking mechanism to lock the pivot blocks (211) in place. For example, in some embodiments, each pivot block (211) can have a locking bushing (213), which enables free movement with no pressure (e.g., when the tractor unit (200) is unclamped) and then locks down to a firm location once the tractor unit (200) is clamped. For example, in some embodiments, the bushing (213) can be disposed such that, when the tractor unit (200) is clamped, the bushing is pressed between a side wall of the tractor unit (200) and the rollers (210) as illustrated in FIGS. 6A and 6B. When clamped, the force on the bushing (213) is such that the friction holds the corresponding pivot block (211) in place as the rollers (210) roll on track rail (110). In some embodiments, the locking bushing (213) can be made of bronze or some other appropriate material. When the tractor unit (200) is unclamped, the pivot block (211) is free to pivot and conform to any profile of track rail (110), e.g., concave, convex, straight, or any combination thereof. This design facilitates full contact of the tractor unit (200) with the track rails (110) and smooth movement of the tractor unit (200). Additionally, in some embodiments, an engagement point of the tractor drive gear (310) (see also FIG. 3A) can be directly aligned with the axis of the pivot bearings of the two front pivot blocks, e.g., the pivot blocks (211) that are located next to the travel drive gear (310). This feature enables the tractor unit (200) to conform to any track rail (110) with no additional adjustment or modifications to the tractor unit (200). The orientation of travel drive gear (310) to the front support pivot blocks, e.g., pivot blocks (211), can be configured to remain the same on all track configurations.

As discussed above and seen in the side view and cross-sectional top view of FIG. 2A, a clamping mechanism (220) of the rail clamping assembly (240) can engage the pivot blocks (211) of wheel/roller set A. In some embodiments, the clamping mechanism (220) is manually operated and can include rotating knobs (221) to facilitate quick manual turning. In some embodiments, the clamping assembly (240) can include a heavy duty screw (222). The clamping assembly (240) can include a clutch or equivalent mechanism such that the screw (222) cannot be over tightened (manually or otherwise). The rail clamping assembly (240) also includes a movable side plate (224) on which, e.g., two pivot blocks (211) of wheel/roller set A are mounted. In some embodiments, the movable side plate (224) can be configured to slide accurately on linear bearings, e.g., the four linear bearings (230). Of course the present invention is not limited to the use of linear bearings (230) and/or screw (222) to engage and disengage roller set A and other methods can be used.

In the fully unclamped position, the distance from the movable side plate (224) of the exemplary mounting mechanism to the exemplary guide track (100) is wide enough so that the wheels/rollers (210) are not touching the track rails (110). That is, in the fully unclamped position, there is enough clearance between the wheels/rollers (210) and track rails (110) such that the tractor unit (200) can be dismounted without interference from track rail (110). In order to clamp or engage the wheels/rollers (210) to the track rails (110), as seen in FIG. 2B, the clamping mechanism (220) can be operated such that the pivot blocks (211) including the rollers (210) move toward the track rails (110). Once the wheels and/or rollers (210) contact the track rails (110), the pivot blocks (211) are free to pivot such that the wheels and/or rollers (210) conform to any profile of track rail (110), e.g., concave, convex, straight, or any combination thereof. Once the clamping mechanism (220) fully engages the rail clamping assembly (240) to the track rails (110), the locking bushing (213) prevents the pivot blocks (211) from moving as discussed above. In some embodiments, when clamped, the surface of each wheel/roller (210) can have multiple points of contact (215) with track rail (110), e.g., from two points to a line of contact. Of course, in other embodiments, the wheels/rollers (210) may contact track rail (110) at only one point. In the above embodiments, wheel/roller set A was moved to clamp or unclamp tractor unit (200) from guide track (100). However, the present invention is not limited to just moving wheel/roller set A, and wheel/roller set B or both wheel/roller sets A and B can be operated by clamping mechanism (220) to clamp or unclamp tractor unit (200) to/from the guide track (100).

The exemplary mounting mechanism of the disclosed technology can provide convenient and easy mounting of a weld head onto different profiles, shapes, and sizes of track rails, which can eliminate the need to perform multiple adjustments for each track configuration. The exemplary mounting mechanism as discussed above includes a quick and elegant way to mount a tractor unit (200) with a single adjustment (e.g., track rail clamping assembly (240) using clamping mechanism (220)) such that no additional adjustments are necessary. Exemplary embodiments of the mounting mechanism discussed above can provide advantages such as reducing and/or removing flexing of and wear on a weld head tractor unit and other components, and enabling very smooth movement of the weld head tractor unit along a guide track at any speed, e.g., at low and high speeds. Additionally, implementation of the exemplary embodiments of the mounting mechanism discussed above can allow any size/weight tractor unit to be mounted, be handled in conditions that are extremely rugged or at high risk of abuse, and be easily clamped and unclamped to the guide track.

In another aspect, the disclosed technology can include a tractor mounting mechanism capable of mounting a weld head tractor unit to multiple shapes and sizes of a welding track rail.

The manner in which a weld head tractor unit is mounted onto a guide track can be associated with the quality of the weld based on the degree of smoothness of the motion of the tractor unit along the guide track. For example, a weld head can flex on a track ring, which can cause tungsten to angle in at "12 o'clock" and angle out at "6 o'clock." This may occur when the weld head is not firmly mounted on the track, causing "crabbing" based on vibration or jerking Additionally, mounting mechanisms can be fragile and easily damaged, e.g., binding and damage to weld head components can occur due to over tightening.

FIG. 2A shows an exemplary mounting mechanism of an exemplary weld head tractor unit (200) that includes a side wheel track roller clamping assembly, shown in the unclamped position. As seen in the front view of the figure, the tractor unit (200) can be mounted to a guide track (e.g., guide track (100)) with the use of a single clamping action as part of the exemplary mounting mechanism. The exemplary mounting mechanism can include multiple opposing wheels and/or rollers, e.g., eight opposing wheels/rollers (210), which can conform to the track rails, e.g., tubular track rail (100). The exemplary eight wheels/rollers (210) can include of four sets of pivoting blocks (211) with two rollers/wheels mounted on each block. The pivoting blocks each on their own central bearing can immediately conform to any size and shape of track. Each pivot block can have a locking bronze bushing which enables free movement with no pressure and then locks down to a firm location once clamped. This design facilitates full contact the tractor unit with the track rails and smooth movement of the tractor unit. Additionally, an engagement point of the tractor drive gear can be directly aligned with the axis of the pivot bearings of the two front pivot blocks. This feature enables the tractor to conform to any track with no additional adjustment or modifications to the tractor). The orientation of drive wheel to the front support pivot blocks, e.g., pivot blocks (211), can be configured to remain the same on all track configurations. As seen in the side view and cross-sectional top view of FIG. 2A, a clamping mechanism (220) with two rotating knobs can engage the four pivot blocks (211) with quick manual turning. Clamping mechanism (220) can include a heavy duty screw which cannot manually be over tightened. The movable side plate on which two pivot blocks are mounted can be configured to slide accurately on four linear ball bearings, e.g., linear bearings (230). In the unclamped position, the distance from the exemplary mounting mechanism to the exemplary guide track (100) is wide enough so that the wheels/rollers (210) are not touching the track rails (110). In order to clamp the rollers (210) to the track rails (110), as seen in FIG. 2B, the clamping mechanism (220) can bring the pivot blocks (211) including the wheels/rollers (210) toward the track rails (110). When clamped, the wheels are interfaced to the track rail having multiple points of contact. The mounting mechanism can be configured to clamp all the wheels/rollers (210) together.

The exemplary mounting mechanism of the disclosed technology can provide convenient and easy mounting of a weld head onto different shapes and sizes of track rings, which can eliminate the need to perform multiple adjustments for each track configuration. The exemplary mounting mechanism includes quick and elegant way to mount a tractor unit with a single screw wheel (e.g., mounting knob (220)) such that no additional adjustments are necessary. This can provide advantages, such as reducing and/or removing flexing and wear, and enabling very smooth movement of a weld head tractor unit along a guide track at any speed, e.g., at low and high speeds. Additionally, implementation of the mounting mechanism can allow any size/weight tractor to be mounted, be handled in conditions that are extremely rugged or at high risk of abuse, and be easily clamped and unclamped to the guide track.

Figure 15:
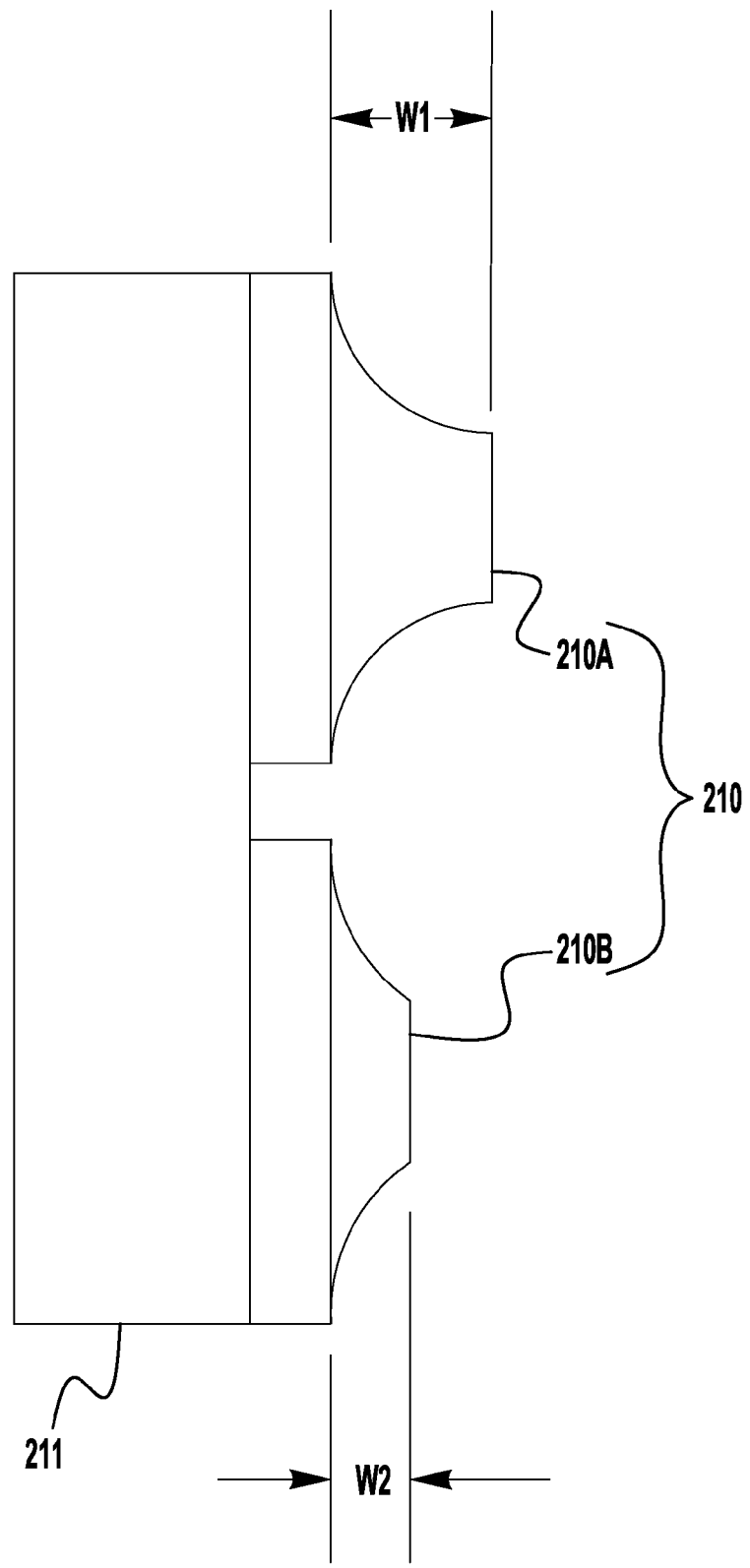
FIG. 15 illustrates an exemplary pivot block/roller arrangement that is consistent with an embodiment of the present invention.

In some embodiments, the rollers (210) are sized to facilitate the mounting of tractor unit (200) onto guide track (100). For example, as illustrated in FIG. 15, the wheel/rollers (210) on each pivot block (211) can have different widths. The wheel/roller (210B) can have a width (W2) that is smaller than the width (W1) of roller (210A). The widths (W2) and (W1) are set such that, when the clamping mechanism (220) puts the tractor unit (200) in the unclamped position, the track rails (110) of guide track (100) can slide past wheels/rollers (210B), but not wheels/rollers (210A).

For example, as illustrated in FIG. 16A, the wheels/rollers (210A) are located in the inner portion of tractor unit (200) and the wheels/rollers (210B) are located on the outer portion. When the tractor unit (200) is in the unclamped position, the distance between opposing inner wheels/rollers (210A) is D1, and the distance between opposing outer wheels/rollers (210B) is D2. Because the widths of the outer wheels/rollers (210B) are set smaller than the widths of the inner wheels/rollers (210A), the distance D1 is smaller than the distance D2. The distance D2 is set such that it is slightly larger than the widest portion of track rail (110) and the distance D1 is slightly less that the widest portion of track rail (110).

For example, as shown in FIG. 16A, the track rails (110) are set such that the distance between the outermost portions of the track rails (110) is D3. Accordingly, the unclamped position of tractor unit (110) is set such that the distance D2 is greater than the distance D3 and the distance D1 is less than the distance D3. Therefore, when the tractor unit (200) is initially mounted on the guide track (100), the outer wheels/rollers (210B) will fit over the track rails (110) as shown in FIG. 16B. The tractor unit (200) will then rest on the inner wheels/rollers (210A) as they contact the track rails (100) as shown in FIG. 16C. The width (W1) of inner rollers (210A) is set such that the tractor unit (200) can safely rest on the portion of wheels/rollers (210A) that makes contact with guide rails (110). Once the tractor unit (200) is resting on the track rails (110), the clamping mechanism (220) can be operated to clamp the tractor unit (200) to guide track (100). As the clamping mechanism (220) is being operated, the track rails (110) and the wheels/rollers (210A) and (210B) will be guided into the proper alignment due to the tapered shape of the inner wheels/rollers (210A) as shown in FIG. 16D. While being clamped, the pivot block (211) with wheels/rollers (210A) and (210B) will operate as discussed above. Of course, the width (W2) of wheels/rollers (210B) is set such that, when clamped, there is sufficient contact area between wheels/rollers (210B) and track rails (110) that the tractor unit (200) can be safely operated.

The clamping mechanism (220) can be configured such that the unclamped position sets the proper distances D1 and D2 on wheels/rollers (210A) and (210B), respectively, for track rails (110) having a width D3. In some embodiments, the clamping mechanism (220) has multiple unclamped settings corresponding to track rails (110) of different widths D3. That is, a single tractor unit (200) can be configured to clamp onto guide tracks (100) having varying width D3, which can range from, e.g., 2 to 12 inches. A single tractor unit (200) can be configured to clamp onto all or just some of the guide tracks (100) that fall within this range. Of course, other widths and ranges are possible. In some embodiments, an indicator or an operator configurable stop (not shown) can be incorporated into the clamping mechanism (220) such that the clamping mechanism (220) can be reliably opened to the corresponding width D3 of the different guide tracks (100). Thus, exemplary embodiments of the present invention allow the tractor unit (200) to be clamped to the guide track (100) without initially having to align the tractor unit rollers (210) to the track rails (110). In addition, the operator does not have to worry about the tractor unit slipping past the inner wheels/rollers and causing damage to travel drive gear and/or track gear when mounting or dismounting the tractor unit.

Figure 3C:
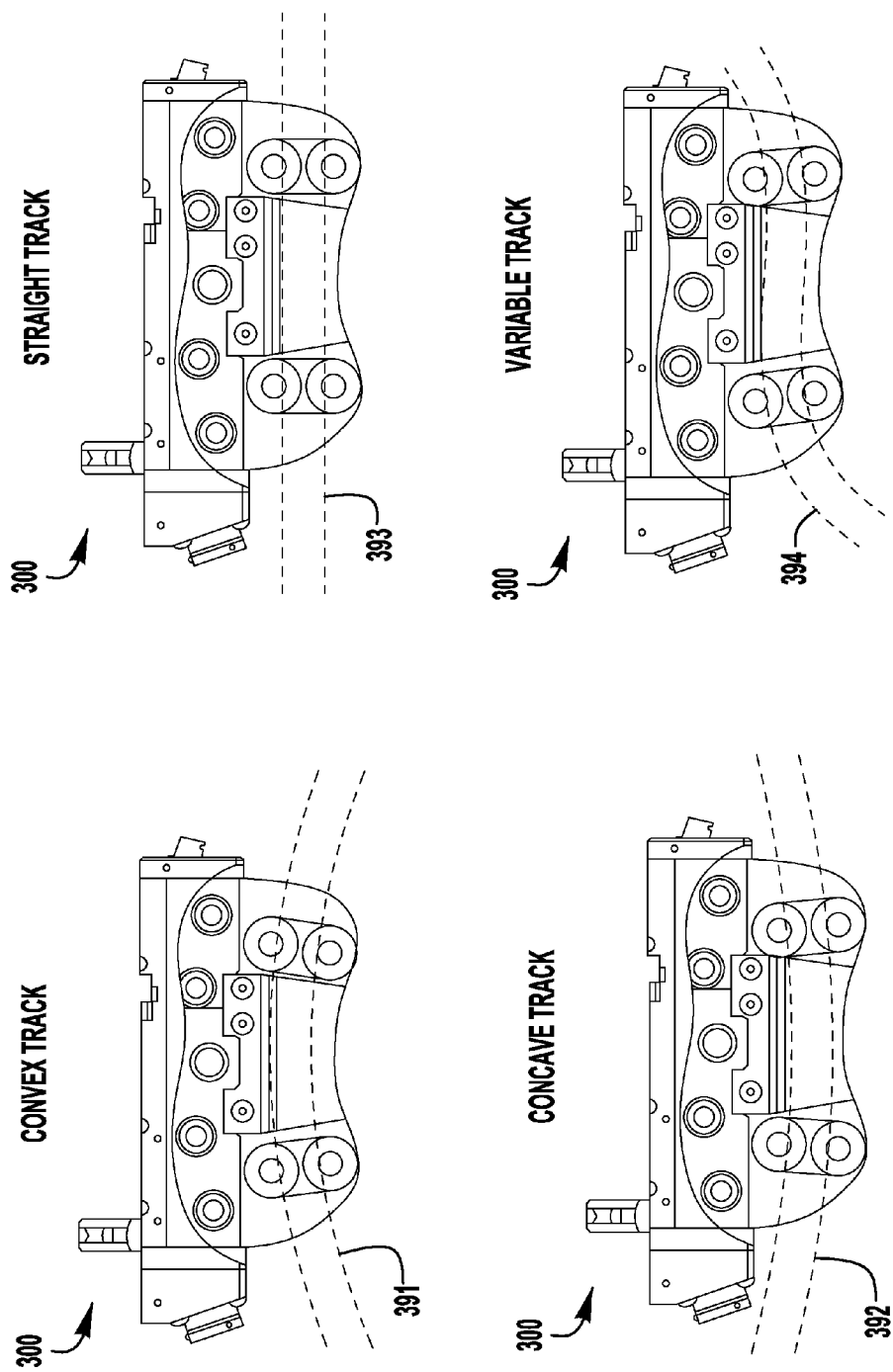
FIG. 3C illustrates an exemplary weld head tractor unit traveling along concave, convex, straight, and variable guide tracks.

In some exemplary embodiments, the present invention can include a travel drive gear engagement mechanism for a weld head tractor unit that can, among other things, easily engage and disengage the tractor unit's travel drive gear to a track gear so that an operator can rapidly position the weld head tractor unit and operate the tractor unit at any desired travel speed, e.g., slow or fast. FIG. 3A illustrates a tractor unit (300) that can be mounted on a guide track, e.g., guide track (100) as illustrated in FIGS. 1A-1C. The guide track (100) includes a track gear (130), which is engaged by the travel drive gear (310) of the tractor unit (300). The travel drive gear (310) and the track gear (130) can have an optimal mesh configuration to smoothly move the tractor unit (300) along guide track (100). It should be noted that, although the exemplary embodiments are described in terms of a tractor unit (300) that mount on guide track (100), the present invention is not limited in this manner as the exemplary travel drive gear engagement mechanism can be incorporated in other types of tractor units, not just ones that mount on the type of guide tracks illustrated in FIG. 1. Additionally, the present invention can be used on guide tracks of a variety of configurations. For example, as illustrated in FIG. 3C, a tractor unit that includes exemplary embodiments of the travel gear engagement mechanism as discussed further below, can exhibit smooth travel along convex guide track (391), concave guide track (392), straight guide track (393), and variable guide track (394)—to name just a few.

As illustrated in FIGS. 3A and 3B, the travel drive gear engagement mechanism can include a clutch lever (320) that, when operated, quickly engages or disengages the travel drive gear (310) to/from track gear (130). For example, in some embodiments, when the clutch lever (320) is rotated to a first position (see FIG. 3A), a connecting member (311) engages the travel drive gear (310) to track gear (130), and when the clutch lever (320) is rotated to a second position (see FIG. 3B), the connecting member (311) disengages the travel drive gear (310) from track gear (130). In some embodiments, the connecting member (311) includes a pivot point and a pivot pin (312). The pivot pin (312) is operatively connected to the connecting member (311) such that the connecting member (311) is pivoted in a rocking-like motion around the pivot pin (312) to engage/disengage the travel drive gear (310) to/from the track gear (130). For example, a first end of the connecting member (311) may be pivoted by a clutch arm (321) while a second end of the connecting member (311), which is operatively connected to travel drive gear (310), engages/disengages the drive gear (310) to/from track gear (130). In still other exemplary embodiments, the clutch lever (320) includes an eccentric cam portion (320A) that is operatively connected to the clutch arm (321) at a point on the cam portion (320A) that is offset from the center of its elongated portion (see FIGS. 3A and 3B). In some embodiments, the clutch arm (321) is connected to the cam portion (320A) at a point that is on the centerline of the elongated portion of the cam portion (320A). Accordingly, due to this offset cam configuration, as the clutch lever (320) is moved to the first position, the clutch arm (321) pivots the connecting member (311) such that the drive gear (310) is engaged. Similarly, due the offset cam configuration, the connecting member (311) will disengage when the clutch lever (320) is moved to the second position. Thus, the exemplary clutch lever (320) configuration allows an operator to quickly release the tractor unit (300) and if necessary, reposition it on the guide track (100) at any time. In addition, when the cam portion (320A) is moved to the first position, the cam goes over the centerline of its elongated portion such that the tendency for the clutch lever (320) is to stay down against the tractor unit (300) rather than open towards the second position. Accordingly, the cam (320A) can be shaped such that the clutch lever (320) does not inadvertently move out of position if the tractor unit (300) is jarred, e.g., due to debris on the track gear (130). In some embodiments, the clutch lever (320) is easily accessible to the operator, e.g., located on the top of the weld head tractor unit (300). However, the clutch lever (320) may be located anywhere on tractor unit (300) as long as the location does not interfere with the travel of tractor unit (300) or welding operations. In addition, although some embodiments of the engagement mechanism use a single pivot point, the present invention is not limited in this manner and the linking mechanisms between clutch lever (320) and drive gear (310) can include any number of pivot points or no pivot points.

In some embodiments, the travel gear engagement mechanism can include an engagement biasing mechanism (313) that puts a biasing force on drive gear (310) so that it stays engaged with track gear (130). In some embodiments, the engagement biasing mechanism (313) permits the drive gear (310) to retract enough to drive over debris on track gear (130) to help alleviate problems such as gears jamming and/or the welding head shifting on tractor unit (300). After the drive gear (310) clears the debris, the engagement biasing mechanism (313) can help drive gear (310) reengage with track gear (130). In some embodiments, the engagement biasing mechanism (313) is located such that it is operatively connected to the connecting member (311) where the clutch arm (321) is attached (see FIG. 3A). Of course, the engagement biasing mechanism (313) can be located at other points in the travel gear engagement mechanism as long as a biasing force is put on drive gear (310) to engage with track gear (130). In some embodiments, the engagement biasing mechanism (313) can be comprised of at least one spring, but in other embodiments, other types of biasing devices can be used. In some embodiments, the travel gear engagement mechanism can also include a retraction biasing mechanism (314) to ensure that the drive gear (310) stays disengaged from track gear (130). In some embodiments, the retraction biasing mechanism (314) is located such that it is operatively connected to the connecting member (311) where the clutch arm (321) is attached (see FIG. 3B). Of course, as with the engagement biasing mechanism (313), the retraction biasing mechanism (314) can be located at other points in the travel gear engagement mechanism as long as there is a biasing force that ensures that drive gear (310) remains disengaged from track gear (130) when in the disengaged position. In some embodiments, the retraction biasing mechanism (314) can be comprised of at least one spring, but in other embodiments, other types of biasing devices can be used.

The type of gear configuration for the travel drive gear (310) and track gear (130) is not limiting, e.g., spur gear, worm gear, etc., as long as the drive gear (310) can move the tractor unit (300) along guide track (100). In some embodiments, as seen in FIG. 6A, the travel drive gear (310) includes a drive gear portion (315) and at least one drive roller portion (316) on at least one side of the drive gear portion (315). The construction of the drive roller portion (316) and drive gear portion (315) is not limiting in that the drive gear portion (315) and the at least one drive roller portion (316) can be an integral unit or separate components that have been operatively attached. In some embodiments, the gear portion (315) is a spur gear and the dimensions of the roller portion(s) (316) correspond to the pitch diameter of the spur gear. As illustrated in FIG. 1C, the track gear (130) can include a track gear portion (131) that is configured to mesh with the drive gear portion (315), e.g., the spur gear, of the travel drive gear (310). In some embodiments, the track gear (130) includes a land portion (132). The land portion (132) can be on one or both sides of track gear portion (131). In some embodiments, the land portion(s) (132) and/or drive roller portion(s) (316) are configured such that the roller portion(s) (316) is(are) in contact with the land portion(s) (132) when the travel drive gear (310) is engaged to the track gear (130). In some embodiments, the land portion(s) (132) will correspond to the pitch diameter of the track gear portion (131) for guide tracks that are curved, or to the pitch line of the track gear portion (131) for guide tracks that are straight. In some embodiments, the dimensions of the land portion(s) (132) and the drive roller portions(s) (316) correspond to the respective pitch diameter(s)/line, thus ensuring proper alignment of the drive gear portion (315) to the track gear portion (131) when engaged. That is, for a curved track gear portion (131), the diameter of the land portion (132), which equals the pitch diameter of the track gear portion (131), will correspond to the diameter of the drive roller portion (316), which equals the pitch diameter of the drive gear portion (315). For a straight track gear portion (131), the dimension of the land portion (132), which equals the pitch line of the track gear portion (131), will correspond to the diameter of the drive roller portion (316), which equals the pitch diameter of the drive gear portion (315). The proper alignment ensures that there is no gear backlash and the tractor unit (300) sees a smooth, stable operation at all operating speeds. In addition, a drive roller (316) that rolls on the land portion(s) (132) also prevents the drive gear portion (315) from jamming into the track gear (130) due to the biasing force from the engagement biasing mechanism (313) or due to over-tightening. This prevents excessive wear and binding of the drive mechanism. In some embodiments, the travel drive unit (310) is configured such that it includes a drive roller portion (316) on each side of drive gear portion (315) and the track gear (130) is configured such that one land portion (132) is located on one side of gear portion (131). Such a configuration maintains proper mating with the drive gear (310) and enables the tractor unit (300) to be mounted in either orientation with respect to track guide (100).

In another aspect, the disclosed technology can include a tractor unit drive pivoting travel gear engagement mechanism for engagement and disengagement of a weld head tractor unit to a guide track.

Excessive slop or backlash in a gear drive of a weld head tractor unit mounted to a guide track can cause improper travel motion as the weld head position shifts and the loading direction on the drive gear changes, which can lead to inconsistent travel speed. In order to avoid improper motion, some methods can include eliminating the backlash between the drive gear and the track gear.

The exemplary drive pivoting travel gear engagement mechanism can allow for the travel motor to be easily engaged and disengaged with a quick release lever, so that an operator can rapidly locate the weld head on the track. In addition, the quick release mechanism allows for greater flexibility in optimizing the travel speed of the tractor, as the gearing of the tractor unit no longer has to be set at a fast travel speed for locating the weld head. That is, if a tractor unit does not have a quick release mechanism, the motor gearing is set to drive the tractor unit very fast in order to minimize the time to properly position the weld head on the track for the start of, e.g., welding operations. However, when the gearing is set for very fast travel, there can be problems when driving the tractor unit at slower speeds. With the quick release lever of the present invention, the tractor unit can be located at the proper position on the track (or very close to the proper position) with the travel gear disengaged. Thus, the travel gear can be optimized for, e.g., welding operations rather than for locating the weld head on the track. FIG. 3A shows an exemplary weld head tractor unit (300) with an exemplary drive pivoting travel gear engagement mechanism mounted on a guide track (e.g., guide track (100) that includes track gear (130)), e.g., in an engaged position. The exemplary drive pivoting travel gear engagement mechanism can include a lever (320) on top of the weld head tractor unit (300) through an eccentric cam that raises and lowers a drive gear (310). As seen in the front and side views of FIG. 3A, drive gear (310) can be engaged with a drive assembly as part of track gear (130), such that the engagement can occur in a rocking-like motion of drive gear (310) on a single pivot rod (311), which can pivot along a pivot pin (312). The exemplary pivoting travel gear engagement mechanism also can include a spring (313) to keep pressure on the drive gear (310), e.g., when it is engaged with the guide track (e.g., track gear (130)) as shown in FIG. 3A. Drive gear (310) can be retracted from the guide track by raising lever (320), which can cause a spring (314) to release pressure and pivot away from engagement, as seen in the front and side views of FIG. 3B. Drive gear (310) can include a plurality of pitch spokes. The pitch diameter of the spokes is not limiting and can be any desired pitch diameter, and can vary from one tractor unit to another. The geometry of a pitch spoke can be, e.g., an involute curve, such that the diameter of a cross section at the apex of the pitch spoke is smaller than the diameter of a cross section at the base of the pitch spoke. However, the geometry of the pitch spoke is not limiting and the pitch spoke can have other geometries, e.g., conical. Additionally, drive gear (310) can include a pitch diameter roller on both sides of the drive gear and on one side of the track gear, which can be configured to maintain proper mating with the drive gear and enable the tractor to mount on either side of the track.

The exemplary pivoting travel gear engagement mechanism can exhibit the following features and advantages, which include a quick release and repositioning of a weld head on a guide track by use of an easily accessible lever, e.g., lever (320); a tractor unit with the exemplary pivoting travel gear engagement mechanism can ride over debris on the track gear (e.g., track gear (130)) without jamming, and then drop back into its correct location; and a tractor unit with the exemplary pivoting travel gear engagement mechanism can be configured to maintain an exact gear pitch diameter distance between gears so there is minimal gear backlash at various positions. For example, substantially zero backlash can result in very smooth stable travel in slow and rapid speeds. Additionally, the exemplary pivoting travel gear engagement mechanism can allow travel along guide tracks of a variety of configurations, as seen in FIG. 3C. For example, tractor unit (300) that includes the exemplary pivoting travel gear engagement mechanism can exhibit smooth travel along convex guide track (391), concave guide track (392), straight guide track (393), and variable guide track (394).

Figure 7:
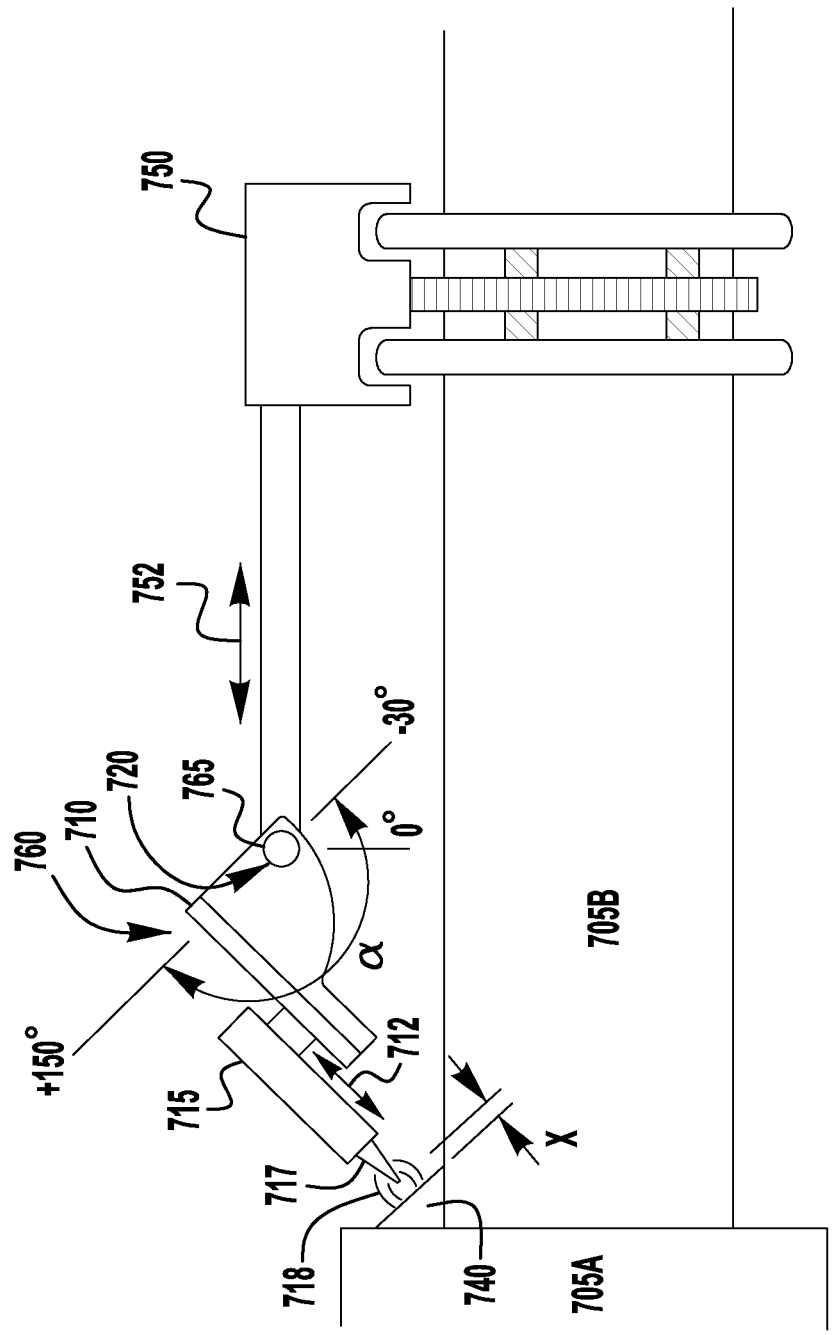
FIG. 7 illustrates an exemplary embodiment of a weld head angle adjustment system that has been incorporated in an orbital track-welding system.

In some exemplary embodiments, the present invention can include a weld head angle adjustment mechanism for a weld head to set the angle between the weld head and a workpiece, i.e., a weld puddle on the workpiece. As illustrated in FIG. 7, exemplary embodiments of the weld head angle adjustment mechanism can be incorporated in a weld head (760) that is operatively connected to a welding base unit (750). The welding base unit (750) can have a fixed relationship to the workpieces (705A and 705B). Accordingly, the angle between the weld head (760) and the surface of a weld puddle (740) of the workpieces (705A and 705B) can be adjusted by adjusting the angle between the weld head (760) and welding base unit (750). The weld head (760) can include an AVC assembly (710) and a welding torch (715). The AVC assembly (710) is operatively connected to the welding torch (715), and can include an AVC assembly control unit (not shown) that is configured to maintain a desired arc length (x) extending from the tip of the torch electrode (717) to the surface of the weld puddle (740) of workpieces (705A and 705B), which in this exemplary embodiment, are pipes of different diameters. Of course, the present invention is not limited to use on pipes, but can be used on any desired workpiece. The AVC assembly control unit maintains the arc length (x) by moving torch (715) in the direction of arrow (712). The arc length (x) is not limiting and can be any desired length that is appropriate for the welding parameters. In some embodiments, the weld head (760) can include other components such as a wire feeder and wire guide (both not shown) but, for brevity, only those components relevant to the present invention will be discussed.

The weld head (760) includes weld head angle adjustment mechanism (720), which adjusts the angle between the weld head (760) and the welding base unit (750). In some embodiments, the angle adjustment mechanism (720) connects the welding head (760) to the welding base unit (750) at a single pivot point (765). The welding base unit (750) can be a drive unit, e.g., an orbital tractor drive, that is configured to move the weld head (760) with torch (715) along the circumferential weld joint created by the workpieces (705A and 705B). Of course, in situations where the weld head (760) is to remain stationary as the workpiece moves, the adjustment mechanism (720) may connect the weld head (760) to a stationary welding base unit (not shown), rather than to a mobile drive unit, e.g., welding base unit (750). The welding base unit (750) (or some other device) can be configured to provide mechanical oscillation as shown by arrow (752) to provide the desired weld weave pattern.

Figure 8:
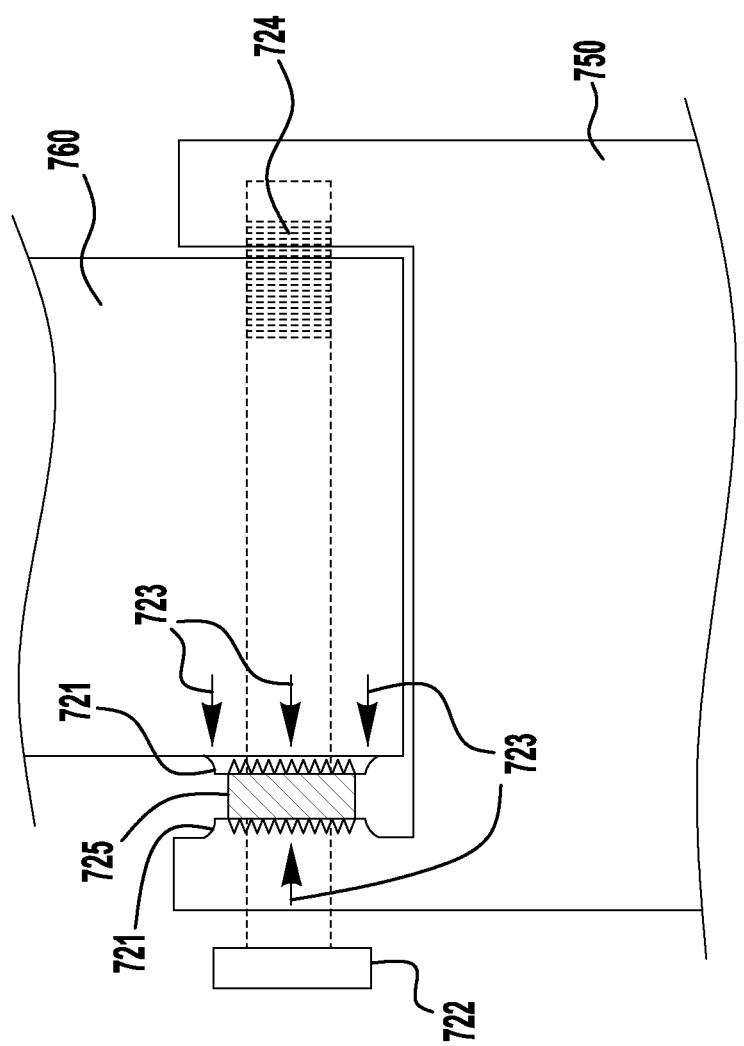
FIG. 8 illustrates an exemplary embodiment of an angle adjustment mechanism that can be in the weld head angle adjustment system of FIG. 7.

The angle adjustment mechanism (720) may be designed to adjust an angle α between the welding head (760) and the welding base unit (750). The freedom of movement of welding head (760) may be any desired range, e.g., up to 90 degrees, up to 140 degrees, or up to 180 degrees. In some embodiments, the angle adjustment mechanism (720) can adjust the angle α between welding head (760) and the base unit (750) from −30 degrees to +150 degrees, and in other embodiments from −30 degrees to +110 degrees. As illustrated in FIG. 8, in exemplary embodiments of the present invention, the angle adjustment mechanism (720) includes a bolt (722). The bolt (722) is operatively connected to the weld head (760) and base unit (750) such that, when the bolt (722) is tightened, the angular position of welding head (760) with respect to the base unit (750) is fixed, and when the bolt (722) is loosened, the angle α between the welding head (760) and the base unit (750) can be adjusted. In some embodiments, the bolt (722) can have threads (724) that thread into the welding head (760) and/or the base unit (750). In some exemplary embodiments, the angle adjustment mechanism (720), the welding head (760), and/or the base unit (750) can include a locking mechanism so that the angular position of weld head (760) with respect to base unit (750) remains firmly fixed (e.g., when the bolt (722) is tightened), and an exact angle is maintained even under heavy load or abuse. For example, the locking mechanism can include interlocking surfaces, e.g., serrated or toothed surfaces (721) that interlock when pressed together. In some embodiments, at least one serrated or toothed surface (721) is built into at least one of the adjustment mechanism (720) (e.g., the bolt (722)), the weld head (760), and the base unit (750). For example, as illustrated in FIG. 8, the weld head (760) and the base unit (750) each have a built-in serrated or toothed surface (721). In some embodiments, the serrated or toothed surfaces (721) can directly interlock with each other. In other embodiments, a washer or plate (725) is disposed between the serrated or toothed surfaces (721). In some embodiments, the washer or plate (725) can be made of a material (e.g., brass, copper, plastic, nylon, etc.) that is softer than the serrated or toothed surfaces (721) such that the serrations embed into the washer or plate (725) to firmly lock the weld head (760) to the base unit (750). Because the washer or plate (725) is made of a softer material, any signs of wear in the locking mechanism will first be seen by the washer or plate (725), rather than the serrated or toothed surfaces (721). Accordingly, because the washer or plate (725) can be made of inexpensive materials that can be easily replaced after showing signs of wear, the locking mechanism will remain durable and stable even after repeated use. The design of the bolt (722) with respect to size and material will depend on the size and weight of the weld head (760) and the welding environments in which the present invention will operate. However, it is contemplated that, in most cases, a large, heavy-duty bolt made of high-strength carbon steel, stainless steel, or other high-strength materials will be used.

Figure 17C:
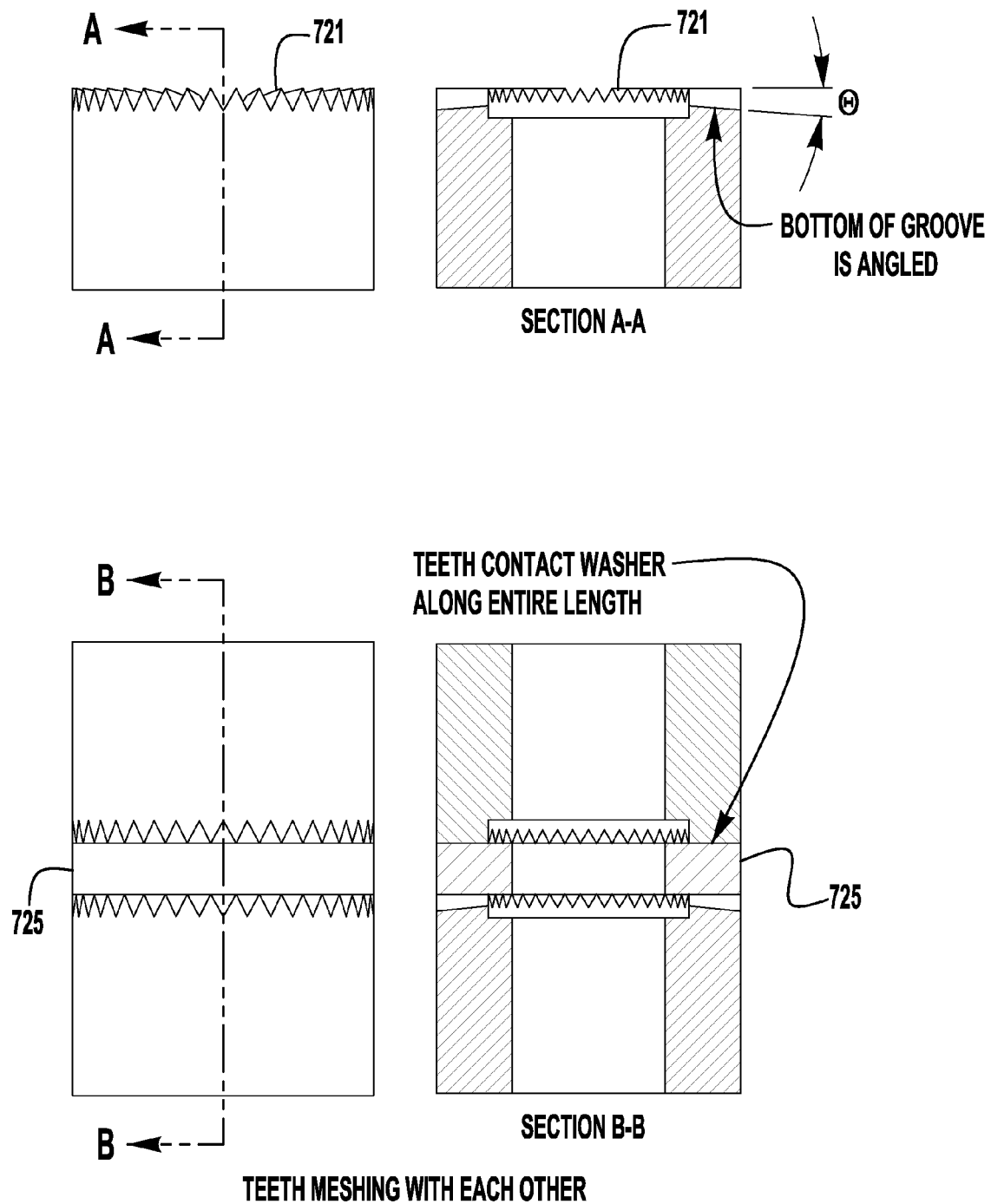

FIGS. 17A to 17D illustrate exemplary serrated or toothed surface (721) configurations that are consistent with the present invention. FIG. 17A illustrates a configuration where the tooth configuration is V shaped. Each V-groove is cut straight across as shown in section A-A by keeping the depth of the cutting tool constant. Because the depth of the cut is constant, manufacturing the serrated or toothed configuration in FIG. 17A is relatively easy.

Another exemplary embodiment of a serrated or toothed surface configuration is illustrated in FIG. 17B. As in the previous embodiment, the tooth configuration is V-shaped. However, in this embodiment the V-groove is cut at an angle (θ) as shown in section A-A. The angle θ depends on the number of teeth and the V-groove cutting tool angle. For example, if the toothed surface (721) has 40 teeth and the groove angle is 60 degrees, an angle θ of about 3.89 degrees will result in the ideal mesh. Of course, if the number of teeth changes or the groove angle changes then θ will be different. As a result, opposing teeth contact each other along the entire length as shown in section B-B, which results in increased strength. This near-perfect mesh is accomplished by changing the depth of the cutting tool as it cuts the groove.

In yet another embodiment, as illustrated in FIG. 17C, a V-groove is cut at an angle (θ) that results in the top edge of the teeth being on the same plane. This is accomplished by the cutting the V-groove at an angle as shown in section A-A. As before, the angle θ for this embodiment will also depend on the number of teeth and the V-groove cutting tool angle. For example, again assuming 40 teeth and a groove angle of 60 degrees, an angle θ of about 7.76 degrees will result in an ideal mesh and the top edge of the teeth being on the same plane. Such a design is ideal if a washer or plate (725) is disposed between opposing teeth as shown in section B-B because the teeth will embed into the washer or plate (725) evenly, which creates a better grip and even clamping.

Figure 17D:
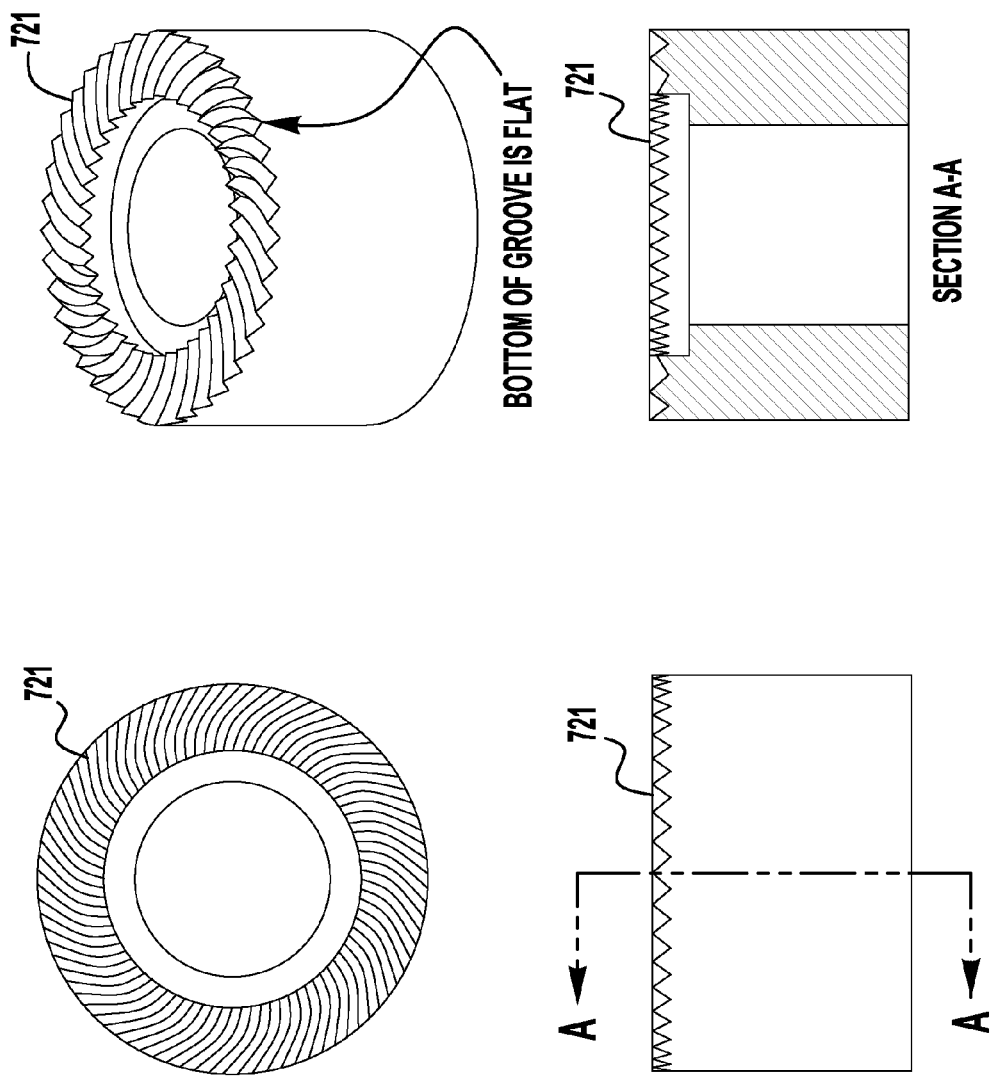

In another embodiment, as illustrated in FIG. 17D, a V-groove is cut into a curved path. In some embodiments, the shape of the curve is an involute curve that keeps the width of the teeth constant. During the cutting, the depth is kept constant as shown in section A-A, i.e., the bottom of the groove is flat. By keeping the width and depth of the teeth constant, this configuration results in the top of the teeth being on the same plane and allows for opposing teeth to have a near-perfect mesh. Thus, the teeth contact each along the entire length. The constant tooth depth makes manufacturing easy and the near-perfect mesh results in increased locking strength. If it is desired to use a washer or plate (725) in between the toothed surfaces (721), the fact that the teeth lie on the same plane results in the teeth embedding into the washer or plate (725) evenly, which creates a better grip and even clamping. Of course, the serrated or toothed surface (721) configuration is not limited to the above embodiments and other configurations can be used.

Because a single bolt (or similar device) is used in the angle adjustment mechanism (720) of the above embodiments, the present invention enables rapid and accurate angling of the welding torch (715), which can be particular important for special weld applications in a variety of difficult angles. However, the present invention is not limited to a single bolt design and any number of bolts (or some other design) can be used so long as the angle α between the weld head (760) and the base unit (750) can be adjusted. In some embodiments, the angle adjustment mechanism (720), weld head (760) and/or the base unit (750) can include scribed lines (723) to enable easy identification of the exact angle α for repeatable set-ups. For example, as illustrated in FIG. 8, the scribed lines (723) are located on weld head (760) and the base unit (750). Of course, the scribed lines (723) are not limited to the locations illustrated in FIG. 8 and can be located anywhere on the weld head (760) and/or the base unit (750) so long as the scribed lines (723) identify the angle α.

In some embodiments, the angle adjustment mechanism (720) can enable the AVC assembly (710) stroke direction to be aligned with the orientation of the torch (715). That is, the AVC assembly (710) and the torch (715) are oriented such that the AVC assembly (710) stroke direction as illustrated by arrow 712 in FIG. 7 is perpendicular to the a surface of the weld puddle (740). Of course, depending on the application, one or both of the AVC assembly (710) and the torch (715) can be set at any desired orientation to the weld puddle (740) and/or the workpieces (705A and 705B). In exemplary embodiments of the present invention, the orientation of the torch (715) with respect to that of the AVC assembly (710) remains fixed as the angle α between weld head (760) and the base unit (750) is adjusted. As discussed above, the exemplary angle adjustment mechanism (720) enables a wide swing or rotation range (e.g., −30° to 110°) of the weld head (760). In some embodiments, the weld head (760) can be set with multiple torch stick-out settings (e.g., two or more settings) such that the torch (715) can extend to a very long reach and/or provide a large stroke (e.g., a 3½" AVC stroke). In addition, implementation of the angle adjustment mechanism (720) as discussed above can also reduce and/or eliminate damaging wear on the angular adjustment mechanism.

In exemplary embodiments, the angle adjustment mechanism (720) can be used to set the orientation of the welding torch (715) with respect to the weld puddle (740) in a fillet welding application, e.g., as illustrated in FIG. 7. In this case the angle α and the orientation of the AVC assemble (710) with respect to the torch (715) are set such that the AVC assembly (710) stroke direction and the corresponding torch (715) movement are perpendicular to the surface of the weld puddle (740), as illustrated by arrow 712. As the base unit (750) (or some other device) mechanically oscillates weld head (760) as illustrated by arrow 752 to produce the desired weld weave pattern, the arc length (x) will change if left uncorrected. As in the convention system discussed above, the AVC assembly (710) can adjust the weld torch (715) position to maintain the desired arc length (x). However, unlike the conventional system, the AVC assembly (710) stroke direction is aligned such that the AVC assembly (710) moves the welding torch (715) in a direction that is perpendicular to the surface of the weld puddle (740), which allows for better control of the arc length (x) across the entire surface of the weld puddle (740). In addition, because AVC assembly (710) stroke direction can stay perpendicular to the weld puddle (740), the sensitivity and speed of the AVC stroke do not need to be adjusted based on angle α (as they would if the AVC stroke direction stayed vertical). Accordingly, the resulting weld is of a better quality.

In another aspect, the disclosed technology can include an adjustable fillet angle that can enable freedom of motion of an arc voltage control (AVC) assembly, e.g., up to 180 degrees. For example, a single adjustment can enable rapid and accurate angling of a welding torch, which can be particularly important for special weld applications in a variety of difficult angles.

When an AVC is oriented separate from the torch angle, this can result in making fillet welds of poor quality. Poor quality welds can also occur based on a variety of reasons related to the fillet angle of an AVC assembly, which can include for example insufficient stability of the setting (e.g., being insecure and weak), overuse wear and lack of durability, limited AVC stroke (e.g., limited to approximately 1 inch AVC stroke), and limited rotation of the AVC assembly (e.g., limited to approximately 40 degrees).

Figure 4:
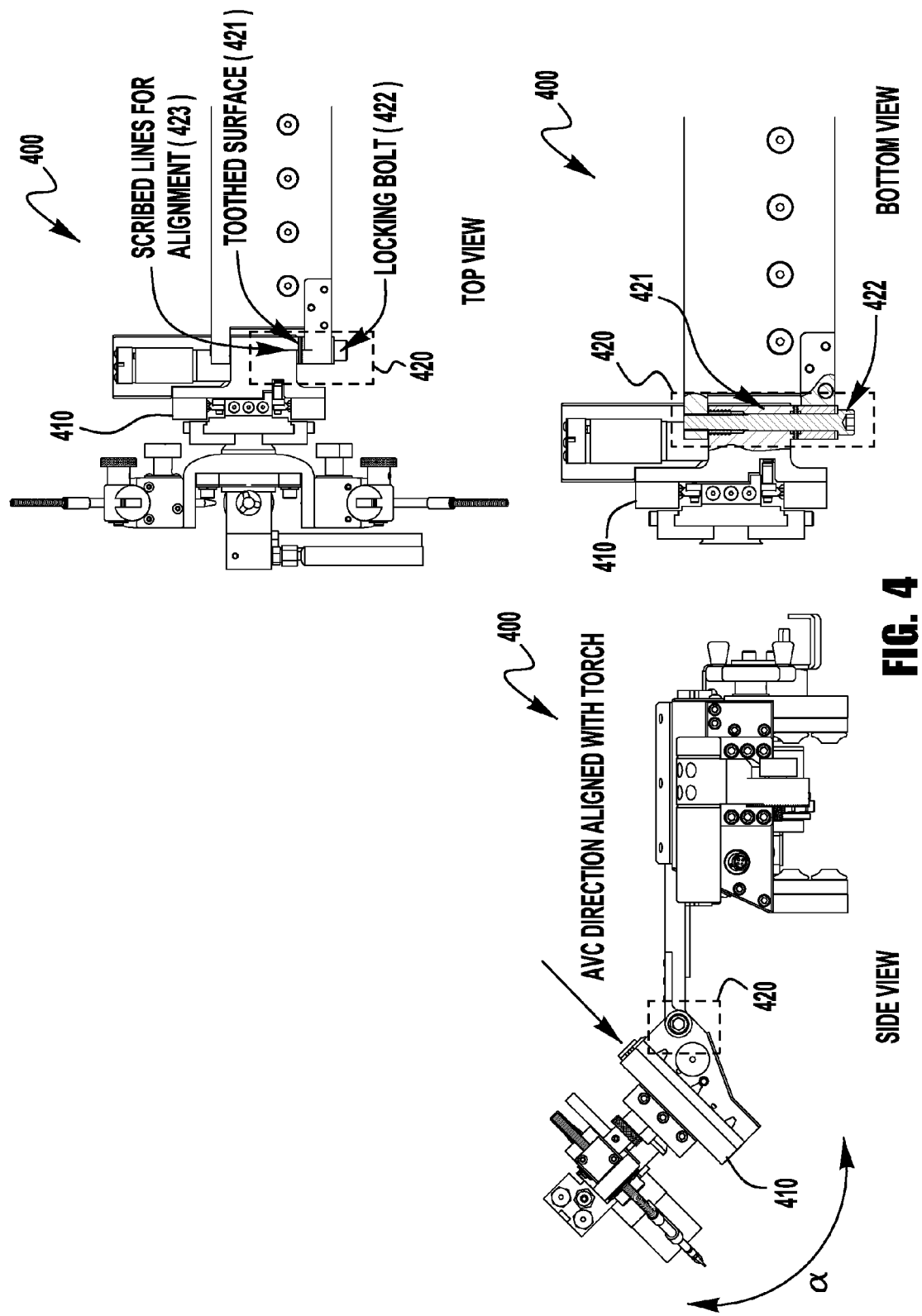
FIG. 4 illustrates an exemplary adjustable weld head angle mechanism of an AVC assembly of a weld head tractor unit.

FIG. 4 shows an exemplary adjustable fillet angle mechanism of an AVC assembly (410) of a weld head tractor unit (400). The exemplary adjustable fillet angle mechanism can include a built-in serrated locking mechanism (420) so an exact angle is maintained even under heavy load or abuse. The exemplary locking mechanism enable fillet angle adjustment by single adjustment, e.g., by tightening or loosening a bolt (422) (e.g., a large, heavy duty bolt), such that toothed surfaces (421) connect in a manner that can correspond to the alignment of scribed increments (423). Scribed increments (423) of the exemplary adjustable fillet angle mechanism can enable easy identification of an exact angle for repeatable set-ups. Implementation of the exemplary adjustable fillet angle mechanism can enable AVC orientation such that it is aligned with torch angle. The exemplary adjustable fillet angle mechanism can also enable a swing or rotation by a desired angle α (e.g.,) 140° of the entire torch assembly with multiple settings (e.g., three settings) for increasing torch stick-out such that the torch can extend to a very long reach, and provide a large stroke (e.g., a 3½" AVC stroke). Implementation of the adjustable fillet angle mechanism can also reduce and/or eliminate damaging wear on angle adjustment of the AVC assembly.

Figure 9:
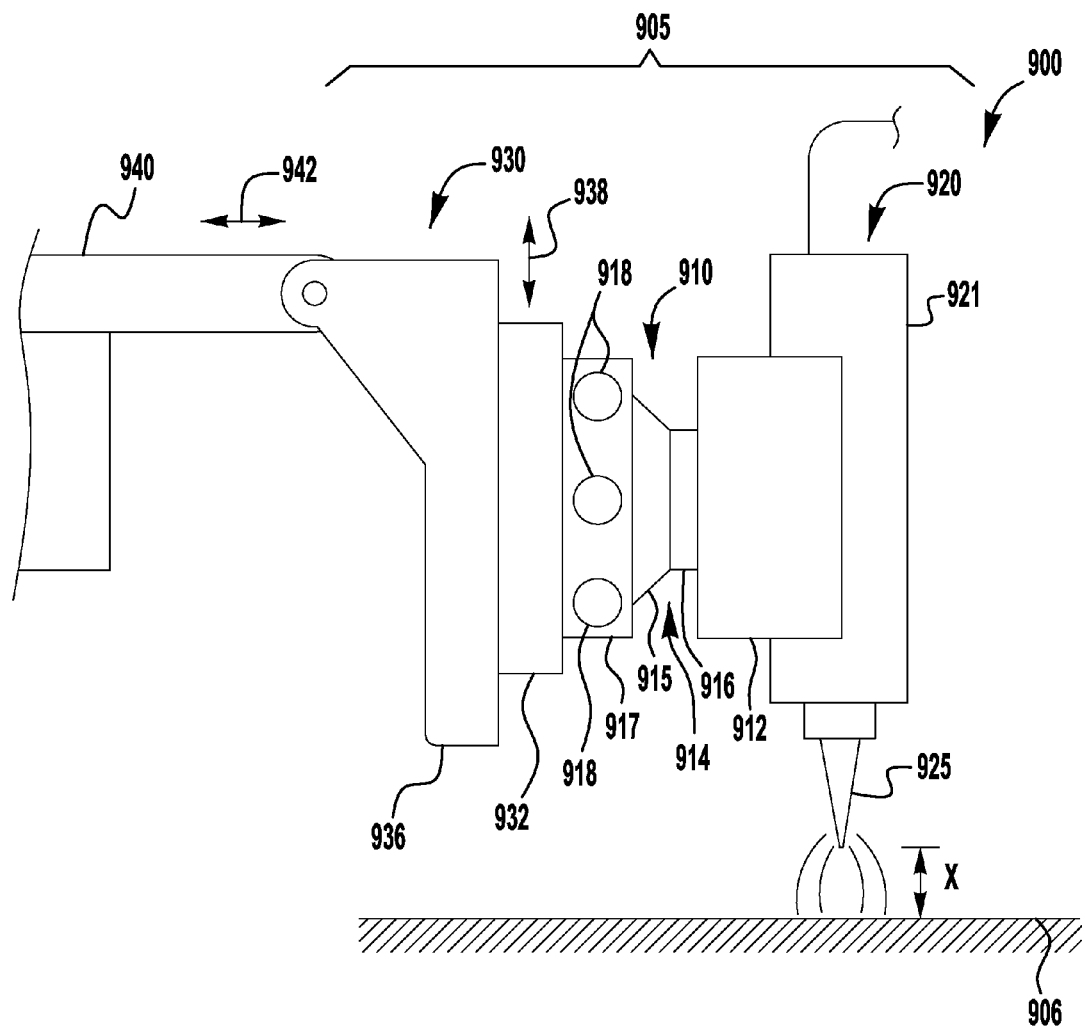
FIG. 9 illustrates an exemplary welding system that may be used in any of brazing, cladding, building up, filling, hardfacing overlaying, joining and welding applications.

In some exemplary embodiments, the present invention can include a lead/lag torch angle adjustment system for a weld held to adjust the lead/lag angle of an electrode. As illustrated in FIG. 9, exemplary embodiments of the lead/lag torch angle adjustment system can be incorporated in a weld head (905) of welding system (900) that may be used in any of brazing, cladding, building up, filling, hard-facing overlaying, joining and welding applications. For brevity, only those components needed to explain the exemplary embodiments of a lead/lag torch angle adjustment system of a weld head are illustrated and discussed. The welding system (900) includes a weld head (905) and a welding base unit (940). The weld head (905) includes a torch assembly (920), a torch head barrel assembly (910), and a torch head support device (930), which can be an arc voltage control (AVC) assembly when AVC is desired. In the following description, the torch head support device (930) is described in terms of being an AVC assembly (930). However, support device (930) can be another component, e.g., a mounting plate. The torch assembly (920) includes a torch head (921) and electrode (925) and is operatively connected to the torch head barrel assembly (910). The torch head barrel assembly (910) includes a torch mount (912), a lead/lag torch angle adjustment mechanism (914), and at least one barrel clamp (916). The torch head barrel assembly (910) operatively connects the torch assembly (920) to the AVC assembly (930), which in turn is operatively connected to the welding base unit (940). Those skilled in the art will recognize that, based on the application, other components such as a wire feeders and wire guides can be connected to the torch assembly (920) and/or the torch head barrel assembly (910) (see, e.g., FIG. 5B). The torch assembly (920) can be of a type used on gas-shielded tungsten arc welding (GTAW) or plasma arc welding (PAW) in which case the electrode (925) can be a tungsten electrode. However, the present invention is not limited to GTAW and PAW systems and can be incorporated in other systems such as gas-shielded metal arc welding (GMAW) systems, laser welding systems, etc.

The AVC assembly (930) can include an AVC base unit (936), an AVC slide plate (932), and an AVC assembly control unit (not shown) that is configured to maintain a desired arc length (x) extending from the tip of the electrode (925) to workpiece (906). The AVC assembly control unit maintains the desired arc length (x) by moving the AVC side plate (932) (and torch head barrel assembly (910)) in the direction of arrow (938). The welding base unit (940) can be a mobile unit, e.g., a tractor unit on a track/rail system, or a stationary unit. For example, if the workpiece (906) is a pipe that is to be welded, the welding base unit (940) can be an orbital tractor drive that is configured to move the weld head (905), including torch assembly (920), along a guide track, e.g., guide track (100) of FIGS. 1A-1C, that is setup around, e.g., a circumferential weld joint of the pipe (either inside or outside of the pipe). Of course, in situations where the weld head (940) is to remain stationary as the workpiece (906) moves, the welding base unit (940) can be a stationary unit, rather than a drive unit. The welding base unit (940) (or some other device) can be configured to provide mechanical oscillation as shown by arrow (942) to provide a desired weld weave pattern.

Figure 10:
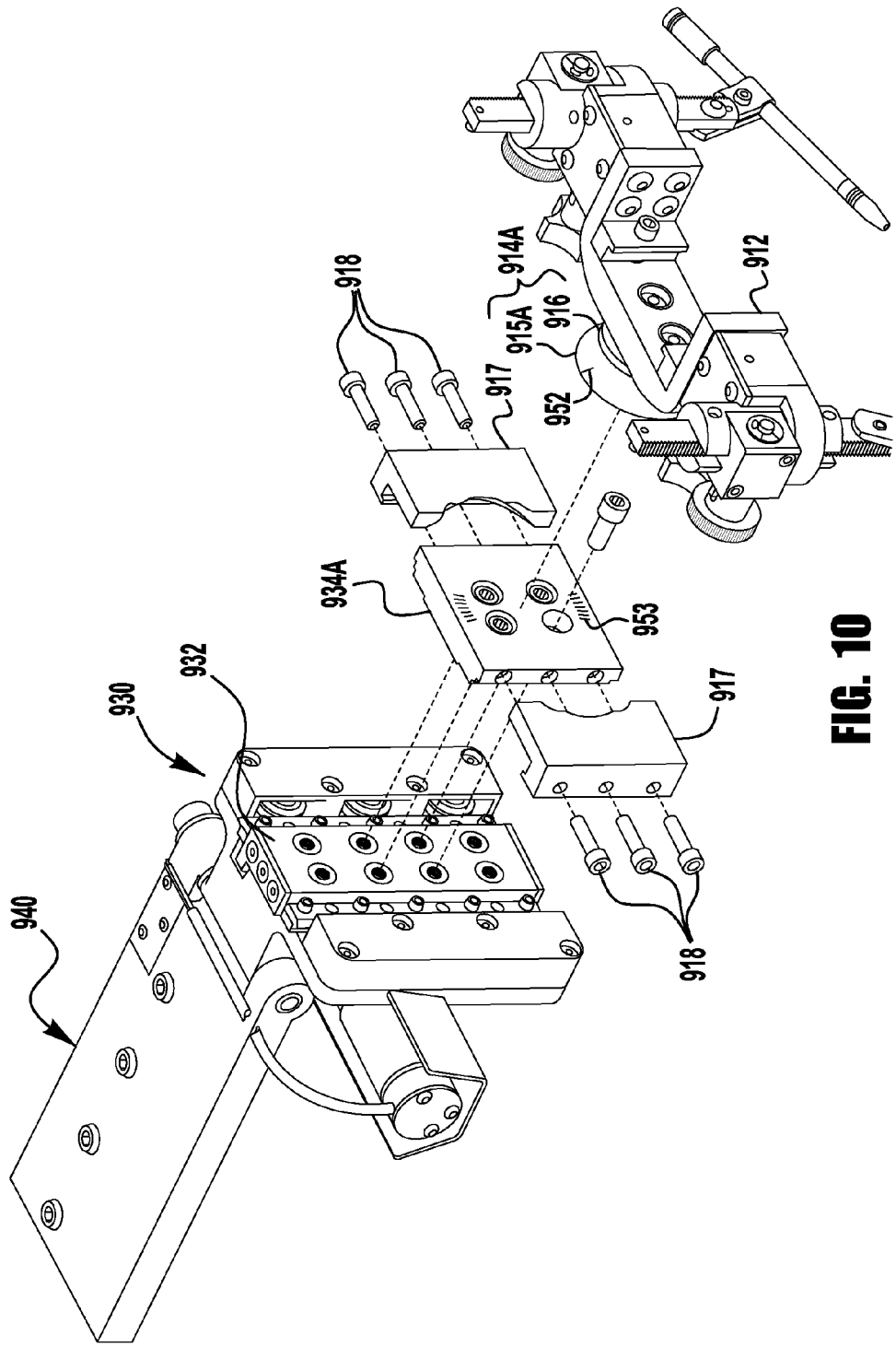
FIG. 10 illustrates an exemplary embodiment of a lead/lag torch angle adjustment mechanism that can be incorporated in the systems of FIGS. 5A, 5B and 9.
Figure 12:
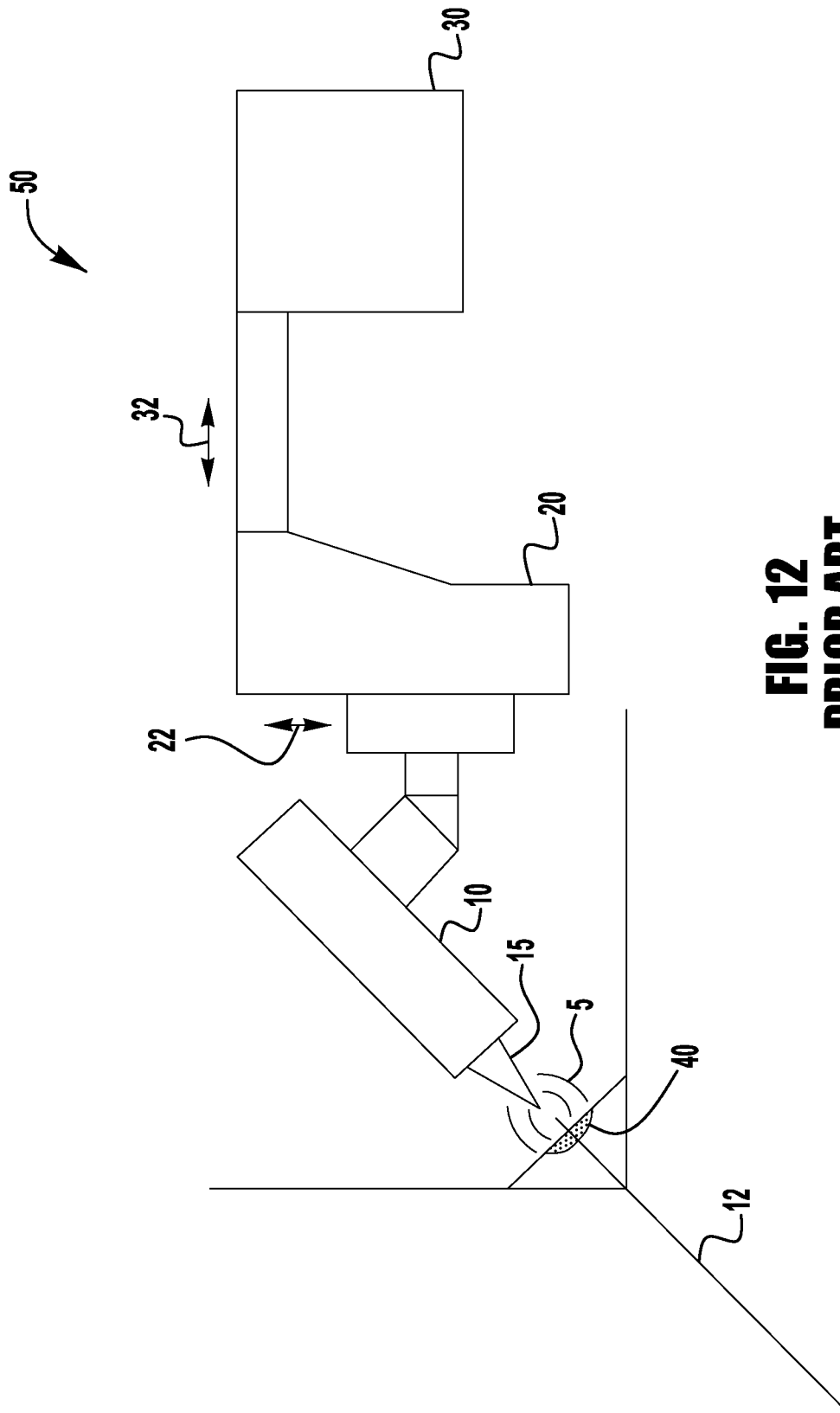
FIG. 12 illustrates a prior art welding system.

The lead/lag torch angle adjustment mechanism (914) can be operatively connected to the support device (930) on the weld head device (905), e.g., an AVC assembly when AVC is desired. In some embodiments, as illustrated in FIGS. 10 and 11A, one end, section (916), of the lead/lag torch angle adjustment mechanism (914A/B) is attached to or is an integral part of torch mount (912). The other end, section (915A/B), of the lead/lag torch angle barrel mechanism (914A/B) is attached to AVC mount plate (934A/B). Adjustment mechanisms (914A) and (914 B) and AVC mount plate (934A) and (934B) represent different embodiments of the adjustment mechanism (914)/mount plate (934) interface. In adjustment mechanism (914A) and mount plate (934A), the end section (915A) and the mount plate (934A) do not have serrations and in adjustment mechanism (914B) and mount plate (934B), the end section (915B) and mount plate (934B) have serrations (951) (discussed further below). In some embodiments, the end section (915/A/B) and/or at least one barrel clamp (917) (or a similar device) are configured such that a transverse movement of the at least one barrel clamp (917) across the end section (915/A/B) produces a force on the section (915/A/B) such that the adjustment mechanism (914/A/B) is pressed against the AVC mount plate (934/A/B) and locks in the desired lead/lag angle for the electrode (925) with respect to the workpiece. For example, as best seen in FIG. 10, the shape of portion (915A) of the adjustment assembly (914A) can be conical and the barrel clamps (917) (or similar devices) can be configured to accept the conical shaped section (915A) of the adjustment mechanism (914A). Accordingly, when the barrel clamps (917) (or similar devices) are attached to the AVC assembly (930), the clamps (917) force the lead/lag torch angle adjustment mechanism (914A) against the AVC mount plate (934A) and lock in the desired lead/lag angle. The barrel clamps (917) (or similar devices) can be attached to AVC mount plate (934/A/B), which is attached to or is an integral part of the AVC slide plate (932), by using, e.g., clamping screws or bolts (918) (or other devices). By loosing the clamping screws or bolts (918) (or other devices), the lead/lag torch angle adjustment mechanism (914/A/B) can be rotated to provide for the desired lead/lag angle for electrode (925). In some embodiments, at least one of the lead and the lag angle can have a range of 0 to at least 15°, 0 to at least 90°, or 0 to 180° (i.e., a full 360 degrees of adjustment of the adjustment mechanism (914/A/B)). Of course, the present invention is not limited to a conical shape for the end section (915/A/B) of adjustment mechanism (914/A/B) and other shapes can be used. In addition, if the welding system does not use an AVC assembly (930), then the end section (915/A/B) of the adjustment mechanism (914/A/B) can be attached to another type of support device, e.g., a mounting plate (or similar device), that is then attached to the welding base unit (940).

To aid in setting the lead/lag angle, in some embodiments, the adjustment mechanism (914/A/B) and/or the AVC mount plate (934/A/B) (or another device) can have alignment lines (952) and (953), respectively (see, e.g., FIGS. 10, 11A, and 11B). The alignment lines (952) and (953) can be, e.g., scribed onto the adjustment mechanism (914/A/B) and/or the AVC mount plate (934/A/B). The alignment lines (952) and/or (953) can be designated as a pointer (e.g., see lines (952)) or can indicate desired increments (see lines (953). The desired increments can be, e.g., every 0.5 degrees or at some other increment. Of course, other methods can be used to display the alignment lines (953). For example, an insert can be installed and clearly marked with numbers designating the lead/lag angle, e.g., 1°, 1.5°, 3°, 5°, etc. In some embodiments, the adjustment mechanism (914/A/B) can rotate the torch assembly (920) with electrode (925) a full 360° to provide a great deal of flexibility in achieving the desired welding configuration setup, i.e., expands the breadth of weld setup configurations as compared to conventional systems. In addition, in some embodiments, the adjustment mechanism (914/A/B) and/or the AVC mount plate (934/A/B) can be configured such that there is a locked location in each direction making double-up welding with a lead/lag angle very simple. As shown above, the exemplary lead/lag torch angle adjustment mechanism (914/A/B) can be easily accessed to adjust the lead/lag angle of the torch assembly (920) without marring weld head components. In addition, the barrel clamps (917) provide strong a locking mechanism that fixes the lead/lag angle when the clamping screws/bolts (918) are tightened.

In some exemplary embodiments, additional locking mechanisms can be included so that the angular position of the torch head barrel assembly (910) with respect to the AVC assembly (930)/support device remains firmly fixed and the desired lead/lag angle is maintained even under heavy load or abuse. For example, the additional locking mechanisms can include serrated or toothed surfaces that interlock when pressed together. In some embodiments, at least one serrated or toothed surface is built into at least one of the lead/lag torch angle adjustment mechanism (914) and AVC mount plate (634)/support device. For example, as illustrated in FIGS. 11A and 11C, the end section (915B) of adjustment mechanism (914B) and AVC mount plate (934B) each have a built-in serrated or toothed surface (951). In some embodiments, the serrated or toothed surfaces (951) can directly interlock with each other. In other embodiments, a washer or plate (950) is disposed between the serrated or toothed surfaces (951). In some embodiments, the washer or plate (950) can be made of a material (e.g., brass, copper, plastic, nylon, etc.) that is softer than that of the serrated or toothed surfaces (951) such that the serrations embed into the washer or plate (950) to firmly lock the adjustment mechanism (914B) to AVC mount plate (934B). Because the washer or plate (950) can be made of a material that is softer than that of the serrated or toothed surfaces (951), any signs of wear in the locking mechanism will first be seen by the washer or plate (950). According, because the washer or plate (950) can be made of inexpensive materials that can be easily replaced after showing signs of wear, the locking mechanism will remain durable and stable even after repeated use. Thus, exemplary embodiments of the present invention can provide further advantages that include more versatile, stronger lock down, and fixed lead/lag settings, e.g., at designated (scribed) angles.

Because the lead/lag torch angle adjustment mechanism (914/A/B) can be rotated by a single adjustment, e.g., by simply loosening the clamping screws/bolts (918) (or similar device), the present invention enables rapid and accurate angling of the torch lead/lag angle and/or re-orientating the torch assembly (920) with electrode (925), which can be particular important for special weld applications in a variety of difficult angles. Further, in some embodiments, the clamping screws/bolts (918) (or similar device) can be completely unscrewed (removed) such that the lag/lead torch angle adjustment mechanism (914/A/B) (and the torch head barrel assembly (910)) can be easily attached or detached.

Figure 5B:
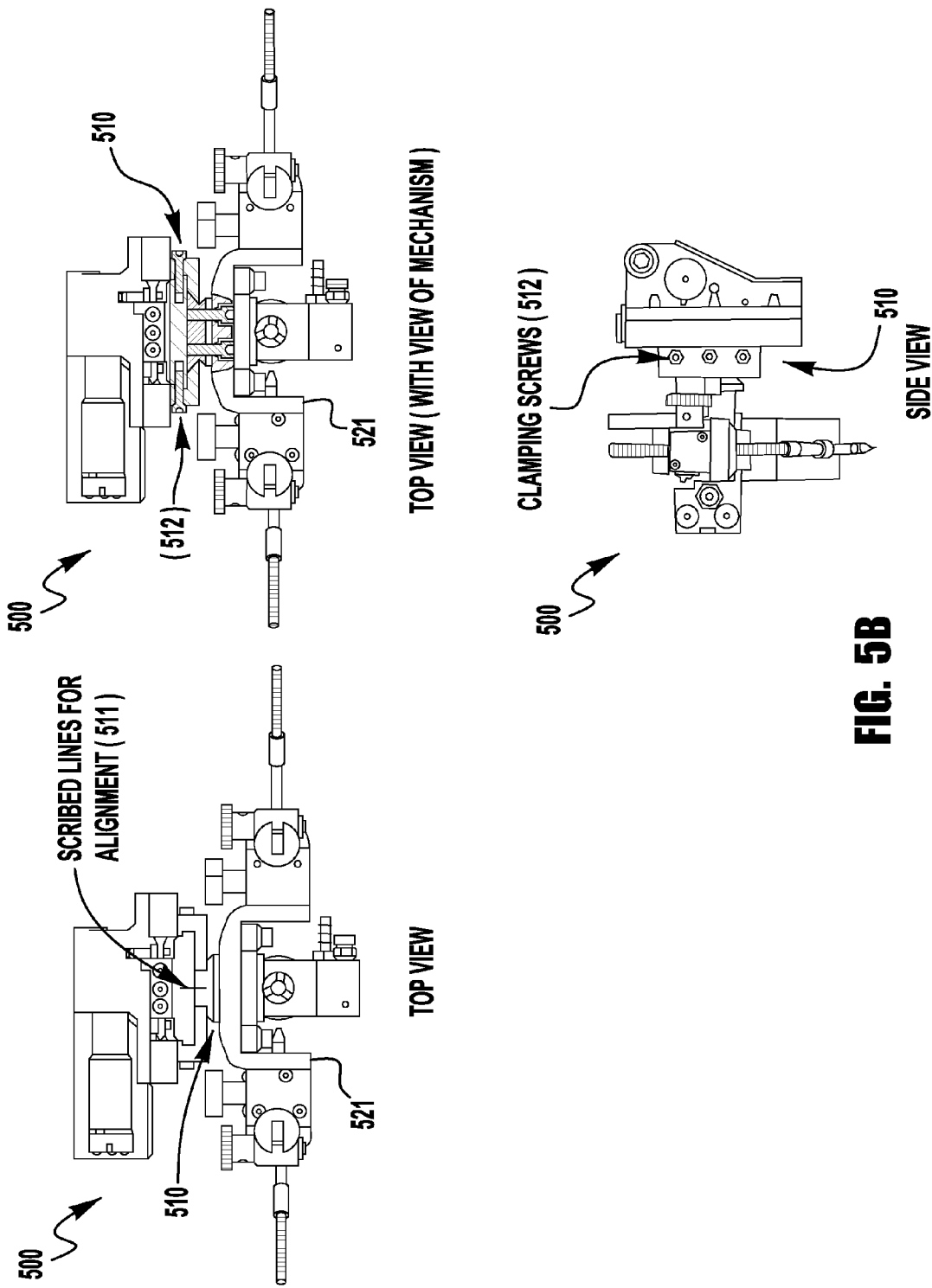

In another aspect, the disclosed technology can include a pivoting lead/lag torch angle mechanism of a torch head barrel assembly on a weld head device. FIG. 5A shows multiple views of an exemplary weld head system (500) that includes an exemplary pivoting lead/lag torch angle mechanism (510). Pivoting lead/lag torch angle mechanism (510) can enable a 360 degree swing of the entire torch (520) by employing a rotational angle-locking mechanism at the interface between a torch head barrel assembly (521) and the remaining portion of weld head system (500). However, the torch head barrel assembly can include an insert (525) to limit the rotation of the lead/lag angle mechanism (510). For example, the insert (525) in FIG. 5A, which is marked "5°," prevents the torch (520) from rotating more than 5°. FIG. 5B shows multiple views of an exemplary weld head system (500) that includes a cross-sectional top view showing the pivoting lead/lag torch angle mechanism (510). Pivoting lag/lead torch angle mechanism (510) can include toothed surfaces at the interface of torch head barrel assembly (521) and the remaining portion of weld head system (500). The toothed surfaces on both sides of the interface can connect in a manner that can correspond to the alignment of scribed line alignments (511). Pivoting lag/lead torch angle mechanism (510) can be rotated by single adjustment, e.g., by tightening or loosening clamping screws (512). Scribed line alignments (511) can allow for a desired alignment. For example, the mechanism can be scribed to easily adjust to a specific angle. An insert can be installed and clearly marked with a number designating the lead/lag angle, e.g., 1°, 1.5°, 3°, 5°, etc., such that there is a hard stop in each direction making double-up welding with a lead angle very simple. Pivoting lag/lead torch angle mechanism (510) can also allow clamping screws (512) to be completely unscrewed from weld head system (500), which can allow torch head barrel assembly (521) to be attached or detached.

A conventional lead/lag adjustment assembly (barrel assembly) can be associated with limited angle adjustment, marring of components, slipping of the weld set-up (e.g., because of a weak mechanism of the torch angle component mechanism), difficult access to make angle adjustments, and inconsistent lead/lag angle settings, among other limitations. The exemplary pivoting lead/lag torch angle barrel assembly can provide a substantially 360 degree swing without any marring, a strong locking mechanism that fixes the lead/lag angle, and easy access to adjust the angle settings. Pivoting lead/lag torch angle mechanism (510) can expand the breadth of weld set-up configurations. This can provide further advantages that include more versatile, stronger lock down, and fixed lead/lag, e.g., at a designated (scribed) angle.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few implementations and examples are described and other implementations, enhancements and variations can be made based on what is described and illustrated in this patent document.

In summary, while the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A tractor unit mounting mechanism, comprising:
    a clamping assembly, the clamping assembly configured to engage and disengage a tractor unit to a guide track comprising a first rail and a second rail; and
    at least one pivot block set comprising a first pivot block and a second pivot block, each of the first pivot block and the second pivot block comprising a first rolling device and a second rolling device,
    wherein the first rolling devices are disposed on an inner portion of the respective pivot blocks and the second rolling devices are disposed on an outer portion of the respective pivot blocks with respect to the tractor unit,
    wherein the at least one pivot block set is disposed on the tractor unit such that the first pivot block and the second pivot block are on opposite sides of the guide track when the tractor unit is mounted on the guide track,
    wherein, when the tractor unit is in a disengaged position, a first distance between an outer portion of the first rail and an outer portion of the second rail is greater than a second distance between the first rolling devices of the at least one pivot block set, and
    wherein the first distance is less than a third distance between the second rolling devices of the at least one pivot block set.

2. The tractor unit mounting mechanism of claim 1, wherein said at least one pivot block set is at least two pivot block sets.

3. The tractor unit mounting mechanism of claim 2, wherein a width of the first rolling device is greater than a width of the second rolling device for each of the first pivot block and the second pivot block.

4. The tractor unit mounting mechanism of claim 3, wherein the first rolling device and the second rolling device of each of the first pivot block and the second pivot block is designed to roll on either the first rail or the second rail, and
    wherein each of the first pivot block and the second pivot block is configured to pivot such that the first rolling device and the second rolling device of the respective pivot block can conform to a profile of the guide track as the tractor unit is engaging the guide track.

5. The tractor unit mounting mechanism of claim 3, wherein each of the first rolling devices and each of the second rolling devices are one of a roller and wheel.

6. The tractor unit mounting mechanism of claim 4, wherein the clamping assembly is configured to operatively connect the first rolling device and the second rolling device of each of the first pivot block and the second pivot block with the guide track when the tractor unit is engaged.

7. The tractor unit mounting mechanism of claim 6, wherein each of the first pivot block and the second pivot block comprises a locking mechanism that is configured to prevent the respective pivot blocks from pivoting once the tractor unit has engaged the guide track.

8. The tractor unit mounting mechanism of claim 7, wherein the locking mechanism is a bushing.

9. The tractor mounting mechanism of claim 8, wherein the bushing is disposed such that friction prevents the pivot block from pivoting when the tractor unit has engaged to the guide track.

10. The tractor mounting mechanism of claim 2, further comprising a movable plate, wherein the first pivot block of each of the at least two pivot block sets is mounted on the movable plate of the tractor unit, and wherein the clamping assembly further comprises a screw operably connected to the movable plate to move the movable plate to engage and disengage the guide track.

11. The tractor mounting mechanism of claim 10, wherein the clamping assembly further comprises a clutch to prevent the screw from being over tightened when the tractor unit is engaged to the guide track.

12. The tractor mounting mechanism of claim 10, wherein the clamping assembly further comprises a linear bearing that is operably connected to the movable plate, and wherein the movable plate rides on the linear bearings when the tractor unit is engaging or disengaging the guide track.

13. The tractor mounting mechanism of claim 4, wherein the profile of the guide track is one of a concave profile, convex profile, a straight profile, or any combination thereof.

14. The tractor mounting mechanism of claim 1, wherein sizes of the first rail and the second rail of the guide track are between $1/16$ inch to 2 inches, inclusive, and wherein shapes of the first rail and the second rail includes one of round, square, triangle, and octagonal.

\* \* \* \* \*